US012303895B2

(12) United States Patent
Spero et al.

(10) Patent No.: US 12,303,895 B2
(45) **Date of Patent: *May 20, 2025**

(54) MODULAR ACTIVE SURFACE DEVICES FOR MICROFLUIDIC SYSTEMS AND METHODS OF MAKING SAME

(71) Applicant: Redbud Labs, Inc., Research Triangle Park, NC (US)

(72) Inventors: Richard Chasen Spero, Research Triangle Park, NC (US); Jay Kenneth Fisher, Research Triangle Park, NC (US); Laura Lee Tormey, Research Triangle Park, NC (US)

(73) Assignee: Redbud Labs, Inc., Research Triangle Park, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/147,241

(22) Filed: Dec. 28, 2022

(65) Prior Publication Data

US 2023/0166254 A1 Jun. 1, 2023

Related U.S. Application Data

(62) Division of application No. 16/756,234, filed as application No. PCT/US2018/038234 on Jun. 19, 2018, now Pat. No. 11,571,694.

(Continued)

(51) Int. Cl.
*B01L 3/00* (2006.01)

(52) U.S. Cl.
CPC ... *B01L 3/502746* (2013.01); *B01L 3/502707* (2013.01); *B01L 3/502761* (2013.01);

(Continued)

(58) Field of Classification Search
CPC ......... B01L 3/502746; B01L 3/502707; B01L 3/502761; B01L 2200/12; B01L 2200/16;

(Continued)

(56) References Cited

U.S. PATENT DOCUMENTS 8,926,906 B2 1/2015 Packirisamy et al.
9,433,940 B2 9/2016 Williams et al.

(Continued)

FOREIGN PATENT DOCUMENTS

WO 2016136273 A1 9/2016
WO 2017049279 A1 3/2017

OTHER PUBLICATIONS

International Search Report and Written Opinion issued in counterpart PCT Application No. PCT/US2018/038234 dated Sep. 10, 2018 (eleven (11) pages).

*Primary Examiner* — Brian J. Sines
(74) *Attorney, Agent, or Firm* — E. Eric Mills; Nicholas P. Stadnyk; Maynard Nexsen PC

(57) ABSTRACT

Modular active surface devices for micro fluidic systems and methods of making same is disclosed. In one example, the modular active surface device includes an active surface layer mounted atop an active surface substrate, a mask mounted atop the active surface layer wherein the mask defines the area, height, and volume of the reaction chamber, and a substrate mounted atop the mask wherein the substrate provides the facing surface to the active surface layer. In other examples, both facing surfaces of the reaction chamber include active surface layers. Further, the modular active surface device can include other layers, such as, but not limited to, adhesive layers, stiffening layers for facilitating handling, and peel-off sealing layers. Further, a large-scale manufacturing method is provided of mass-producing the modular active surface devices. Further, a method is pro- (Continued)

vided of using a plasma bonding process to bond the active surface layer to the active surface substrate.

37 Claims, 19 Drawing Sheets

Related U.S. Application Data

(60) Provisional application No. 62/522,536, filed on Jun. 20, 2017.

(52) U.S. Cl.
CPC ....... *B01L 2200/12* (2013.01); *B01L 2200/16* (2013.01); *B01L 2300/041* (2013.01); *B01L 2300/06* (2013.01); *B01L 2300/0654* (2013.01); *B01L 2300/0816* (2013.01); *B01L 2300/0877* (2013.01); *B01L 2300/0883* (2013.01); *B01L 2300/12* (2013.01); *B01L 2400/088* (2013.01)

(58) Field of Classification Search
CPC ........... B01L 2300/041; B01L 2300/06; B01L 2300/0654; B01L 2300/0816; B01L 2300/0877; B01L 2300/0883; B01L 2300/12; B01L 2400/088
See application file for complete search history.

(56) References Cited

U.S. PATENT DOCUMENTS

| | | | |
|---|---|---|---|
| 11,571,694 B2 * | 2/2023 | Spero | B01L 3/502761 |
| 2007/0003444 A1 | 1/2007 | Howell et al. | |
| 2009/0236226 A1 | 9/2009 | Yuen | |
| 2011/0104817 A1 | 5/2011 | Kang et al. | |
| 2014/0001146 A1 | 1/2014 | Superfine et al. | |
| 2015/0087544 A1 | 3/2015 | Putnam et al. | |
| 2017/0113221 A1 | 4/2017 | Hoffman et al. | |

* cited by examiner

MODULAR ACTIVE SURFACE DEVICES FOR MICROFLUIDIC SYSTEMS AND METHODS OF MAKING SAME

CROSS REFERENCE TO RELATED APPLICATIONS

This application is a 35 U.S.C. § 111 divisional application of U.S. application Ser. No. 16/756,234 filed Apr. 15, 2020, which is a 35 U.S.C. § 371 U.S. national phase entry of International Application No. PCT/US2018/038234 having an international filing date of Jun. 19, 2018, which claims priority to U.S. provisional application Ser. No. 62/522,536, filed Jun. 20, 2017, the entire disclosures of which are hereby fully incorporated herein by reference.

TECHNICAL FIELD OF THE INVENTION

The presently disclosed subject matter relates generally to the processing of biological materials and more particularly to modular active surface devices microfluidic system for microfluidic systems and methods of making same

BACKGROUND

Microfluidic systems can include an active surface, which can be, for example, any surface or area (typically inside a reaction or assay chamber) that is used for processing biological materials. However, there can be considerable cost and complexity associated with providing an active surface within microfluidic systems. Further, there can be certain barriers to testing the active surface performance within the microfluidic system. Therefore, new approaches are needed to simplify the process of providing an active surface in a microfluidic system.

SUMMARY OF THE INVENTION

To address the foregoing problems, in whole or in part, and/or other problems that may have been observed by persons skilled in the art, the present disclosure provides compositions and methods as described by way of example as set forth below.

In one embodiment, a modular active surface device for processing biological materials is provided comprising:

- a first active surface atop a first active surface substrate;
- at least one reaction chamber comprising fluid ports, wherein the fluid ports comprise one or more input ports and one or more output ports; and
- one or more additional layers selected from the group consisting of one or more adhesive layers, one or more stiffening layers for facilitating handling, and one or more peel-off sealing layers;

wherein the first active surface atop the first active surface substrate forms at least one surface of the reaction chamber; and further wherein the modular active surface device is configured to integrate into a microfluidics cartridge. In another embodiment, the modular active surface device further comprises a mask mounted atop the first active surface, wherein the mask defines the area, height, and volume of the reaction chamber. In another embodiment, the modular active surface device further comprises a second substrate mounted atop the mask, wherein a surface of the second substrate faces the first active surface. In another embodiment, the surface of the second substrate that faces the first active surface comprises a second active surface, and further wherein the first active surface and the second active surface are separated by a space.

In another embodiment, the active surfaces of the modular active surface device are configured to manipulate a fluid inside the reaction chamber. In another embodiment, the active surfaces comprise one or more elements selected from the group consisting of static surface-attached microposts, actuated surface-attached microposts, a microscale texture, a microscale topography, a system for physical perturbation of the first active surface, an electrical, electronic, and/or electromagnetic system, and an optically active surface. In another embodiment, the system for physical perturbation of the first active surface is configured to perturb the first active surface by vibration or deformation. In another embodiment, the optically active surface comprises elements selected from the group consisting of lenses, LEDs, and one or more materials that interact with external light sources. In another embodiment, manipulation of the fluid inside the reaction chamber is selected from the group consisting of generating fluid flow, altering the flow profile of an externally driven fluid, fractionating a sample into constituent parts, establishing one or more concentration gradients, and eliminating one or more concentration gradients.

In another embodiment, the active surface substrates of the modular active surface device are rigid or semi-rigid plastic substrates. In another embodiment, the active surfaces are micropost active surface layers comprising surface-attached microposts. In another embodiment, the surface-attached microposts are arranged in arrays.

In another embodiment, the surface-attached microposts of the modular active surface device are configured for actuation in the presence of an actuation force. In another embodiment, the actuation force is selected from the group consisting of a magnetic field, a thermal field, a sonic field, an optical field, an electrical field, and a vibrational field.

In another embodiment, the micropost active surfaces in the reaction chamber of the modular active surface device are configured for mixing operations, binding operations, and cell processing operations. In another embodiment, the cell processing operations are selected from the group consisting of: cell concentration, cell collection, cell filtration, cell washing, cell counting, cell recovery, cell lysis, and cell de-clumping.

In another embodiment, the modular active surface device is configured to integrate into a microfluidics cartridge that comprises a recessed region configured to receive the modular active surface device. In another embodiment, the microfluidics cartridge further comprises fluid lines set to correspond to the fluid port, wherein when microfluidics device receives the modular active surface device, the microfluidics device and the modular active surface device are fluidly coupled. In another embodiment, the modular active surface device further comprises an adhesive layer for bonding to the microfluidics cartridge.

In another embodiment, the modular active surface device comprises microposts formed of an an active surface material. In another embodiment, the active surface material is polydimethylsiloxane (PDMS). In another embodiment, the microposts range in length from about 1µηι to about 100µηι. In another embodiment, the microposts range in diameter from about 0.1µηι to about 10µηι. In another embodiment, the microposts have a cross-sectional shape selected from the group consisting of circular, ovular, square, rectangular, and triangular. In another embodiment, the microposts are oriented substantially normal to the plane of the substrate. In another embodiment, the microposts are oriented at an angle α with respect to normal of the plane of the substrate. In another embodiment, the microposts are oriented at a pitch of from about 0μηι to about 50μηι. In another embodiment, the microposts are oriented at a pitch of from about 0μηι to about 50μηι.

In another embodiment, the mask layer of the modular active surface device comprises an opening for forming the reaction chamber, an antechamber, a fluid path between the antechamber and the opening. In another embodiment, the antechamber of the modular active surface device comprises dried reagent and/or a dried reagent pellet configured to dissolve when a sample fluid is added to the antechamber, thereby enabling a mixture of sample fluid and reagent to flow into the reaction chamber.

In another embodiment, the fluid path of the modular active surface device has a serpentine path configured to provide adequate time for the dried reagent and/or dried reagent pellet to dissolve completely before reaching the reaction chamber.

In another embodiment, the modular active surface device comprises multiple antechambers and separate fluid paths between each antechamber and the opening. In another embodiment, the modular active surface device comprises multiple antechambers and a single fluid path between the multiple antechambers and the opening. In another embodiment, the flow of fluids from the multiple antechambers into the single fluid path is controlled by the opening and closing of valves between the multiple antechambers and the single fluid path, and the opening and closing of the valves are controlled by a control instrument.

In another embodiment, the modular active surface device comprises a plurality of reaction chambers arranged in an array. In another embodiment, the plurality of reaction chambers comprises eight reaction chambers arranged in a 2×4 array.

In another embodiment, a wafer-scale manufacturing process is provided for producing any of the modular active surface devices described above, comprising the steps of:

a) providing an active surface material-filled polycarbonate (PC) substrate comprising active surface material microposts of the micropost active surface layer embedded in the substrate;
b) forming an active surface wafer by bonding the active surface material-side of the active surface material-filled substrate to a second substrate using a plasma bonding process;
c) forming a plurality of through-holes in the active surface wafer to form a cut active surface wafer;
d) releasing the microposts of the cut active surface wafer to form a released active surface wafer;
e) providing a mask layer and installing the mask layer atop the released active surface wafer to form a masked active surface wafer;
f) sealing both sides of the masked active surface wafer to produce a masked and sealed active surface wafer; and
g) dicing the masked and sealed active surface wafer into multiple individual modular active surface devices.

In another embodiment, a wafer-scale manufacturing process is provided for producing any of the modular active surface devices described above, comprising the steps of:

a) providing an active surface material-filled substrate comprising active surface material microposts of the micropost active surface layer embedded in the substrate;
b) providing a second substrate to which the active surface material substrate portion of the micropost array can be bonded;
c) depositing a silicon oxide layer on one surface of the second substrate;
d) plasma treating the silicon oxide layer;
e) placing the active surface material substrate portion of micropost array into contact with the silicon oxide layer of the second substrate; and
f) performing a plasma activation process to bond the active surface material substrate portion of the micropost array to the silicon oxide later of the substrate.

In another embodiment of the wafer-scale manufacturing process, the active surface material-filled substrate is a 6-inch or a 12-inch diameter substrate. In another embodiment, the active surface material is polydimethylsiloxane (PDMS).

Other compositions, methods, features, and advantages of the invention will be or will become apparent to one with skill in the art upon examination of the following figures and detailed description. It is intended that all such additional compositions, methods, features, and advantages be included within this description, be within the scope of the invention, and be protected by the accompanying claims.

BRIEF DESCRIPTION OF THE DRAWINGS

The features and advantages of the present invention will be more clearly understood from the following description taken in conjunction with the accompanying drawings, which are not necessarily drawn to scale, and wherein.

DETAILED DESCRIPTION

Figure 1A:
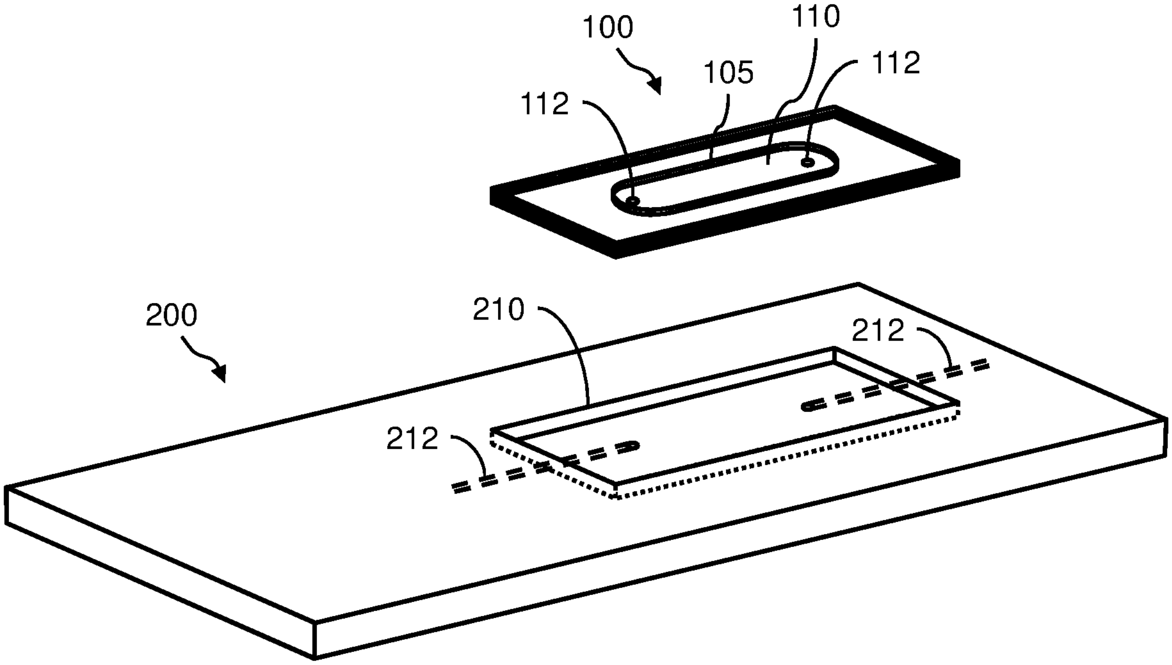
FIG. 1A and FIG. 1B illustrate an example of the presently disclosed modular active surface device in relation to a fluidics cartridge.

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

General Definitions

As used herein, the terms "surface-attached post" or "surface-attached micropost" or "surface-attached structure" are used interchangeably. Generally, a surface-attached structure has two opposing ends: a fixed end and a free end. The fixed end may be attached to a substrate by any suitable means, depending on the fabrication technique and materials employed. The fixed end may be "attached" by being integrally formed with or adjoined to the substrate, such as by a microfabrication process. Alternatively, the fixed end may be "attached" via a bonding, adhesion, fusion, or welding process. The surface-attached structure has a length defined from the fixed end to the free end, and a cross-section lying in a plane orthogonal to the length. For example, using the Cartesian coordinate system as a frame of reference, and associating the length of the surface-attached structure with the z-axis (which may be a curved axis), the cross-section of the surface-attached structure lies in the x-y plane.

Generally, the cross-section of the surface-attached structure may have any shape, such as rounded (e.g., circular, elliptical, etc.), polygonal (or prismatic, rectilinear, etc.), polygonal with rounded features (e.g., rectilinear with rounded corners), or irregular. The size of the cross-section of the surface-attached structure in the x-y plane may be defined by the "characteristic dimension" of the cross-section, which is shape-dependent. As examples, the characteristic dimension may be diameter in the case of a circular cross-section, major axis in the case of an elliptical cross-section, or maximum length or width in the case of a polygonal cross-section. The characteristic dimension of an irregularly shaped cross-section may be taken to be the dimension characteristic of a regularly shaped cross-section that the irregularly shaped cross-section most closely approximates (e.g., diameter of a circle, major axis of an ellipse, length or width of a polygon, etc.).

A surface-attached structure as described herein is non-movable (static, rigid, etc.) or movable (flexible, deflectable, bendable, etc.) relative to its fixed end or point of attachment to the substrate. To facilitate the movability of movable surface-attached structures, the surface-attached structure may include a flexible body composed of an elastomeric (flexible) material, and may have an elongated geometry in the sense that the dominant dimension of the surface-attached structure is its length—that is, the length is substantially greater than the characteristic dimension. Examples of the composition of the flexible body include, but are not limited to, elastomeric materials such as hydrogel and other active surface materials (for example, polydimethylsiloxane (PDMS)).

The movable surface-attached structure is configured such that the movement of the surface-attached structure relative to its fixed end may be actuated or induced in a non-contacting manner, specifically by an applied magnetic or electric field of a desired strength, field line orientation, and frequency (which may be zero in the case of a magnetostatic or electrostatic field). To render the surface-attached structure movable by an applied magnetic or electric field, the surface-attached structure may include an appropriate metallic component disposed on or in the flexible body of the surface-attached structure. To render the surface-attached structure responsive to a magnetic field, the metallic component may be a ferromagnetic material such as, for example, iron, nickel, cobalt, or magnetic alloys thereof, one non-limiting example being "alnico" (an iron alloy containing aluminum, nickel, and cobalt). To render the surface-attached structure responsive to an electric field, the metallic component may be a metal exhibiting good electrical conductivity such as, for example, copper, aluminum, gold, and silver, and well as various other metals and metal alloys. Depending on the fabrication technique utilized, the metallic component may be formed as a layer (or coating, film, etc.) on the outside surface of the flexible body at a selected region of the flexible body along its length. The layer may be a continuous layer or a densely grouped arrangement of particles. Alternatively, the metallic component may be formed as an arrangement of particles embedded in the flexible body at a selected region thereof.

As used herein, the term "actuation force" refers to the force applied to the microposts. For example, the actuation force may include a magnetic, thermal, sonic, or electric force. Notably, the actuation force may be applied as a function of frequency or amplitude, or as an impulse force (i.e., a step function). Similarly, other actuation forces may be used without departing from the scope of the present subject matter, such as fluid flow across the micropost array (e.g., flexible microposts that are used as flow sensors via monitoring their tilt angle with an optical system).

Accordingly, the application of an actuation force actuates the movable surface-attached microposts into movement. For example, the actuation occurs by contacting cell processing chamber with the control instrument comprising elements that provide an actuation force, such as a magnetic or electric field. Accordingly, the control instrument includes, for example, any mechanisms for actuating the microposts (e.g., magnetic system), any mechanisms for counting the cells (e.g., imaging system), the pneumatics for pumping the fluids (e.g., pumps, fluid ports, valves), and a controller (e.g., microprocessor).

As used herein, a "flow cell" is any chamber comprising a solid surface across which one or more liquids can be flowed, wherein the chamber has at least one inlet and at least one outlet.

The term "micropost array" is herein used to describe an array of small posts, extending outwards from a substrate, that typically range from 1 to 100 micrometers in height. In one embodiment, microposts of a micropost array may be vertically-aligned. Notably, each micropost includes a proximal end that is attached to the substrate base and a distal end or tip that is opposite the proximal end. Microposts may be arranged in arrays such as, for example, the microposts described in U.S. Pat. No. 9,238,869, entitled "Methods and systems for using actuated surface-attached posts for assessing biofluid rheology," issued on Jan. 19, 2016; the entire disclosure of which is incorporated herein by reference. U.S. Pat. No. 9,238,869 describes methods, systems, and computer readable media for using actuated surface-attached posts for assessing biofluid rheology. One method described in U.S. Pat. No. 9,238,869 is directed to testing properties of a biofluid specimen that includes placing the specimen onto a micropost array having a plurality of microposts extending outwards from a substrate, wherein each micropost includes a proximal end attached to the substrate and a distal end opposite the proximal end, and generating an actuation force in proximity to the micropost array to actuate the microposts, thereby compelling at least some of the microposts to exhibit motion. This method further includes measuring the motion of at least one of the microposts in response to the actuation force and determining a property of the specimen based on the measured motion of the at least one micropost.

U.S. Pat. No. 9,238,869 also states that the microposts and micropost substrate of the micropost array can be formed of polydimethylsiloxane (PDMS). Further, microposts may include a flexible body and a metallic component disposed on or in the body, wherein application of a magnetic or electric field actuates the microposts into movement relative to the surface to which they are attached. In this example, the actuation force generated by the actuation mechanism is a magnetic and/or electrical actuation force.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments+1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Modular Active Surface Devices for Microfluidic Systems and Methods of Making Same In some embodiments, the presently disclosed subject matter provides modular active surface devices for microfluidic systems and methods of making same. Namely, the presently disclosed modular active surface devices and methods provide drop-in modules for easily integrating into any fluidics cartridges or systems of the end users. Because the presently disclosed modular active surface devices are provided separately from the end users' fluidics cartridges, the cost and complexity of providing the active surface can be separated from that of, for example, low cost plastic fluidics cartridges.

As used herein "active surface" means any surface or area that can be used for processing samples including, but not limited to, biological materials, fluids, environmental samples (e.g., water samples, air samples, soil samples, solid and liquid wastes, and animal and vegetable tissues), and industrial samples (e.g., food, reagents, and the like). The active surface can be inside a reaction or assay chamber. For example, the active surface can be any surface that has properties designed to manipulate the fluid inside the chamber. Manipulation can include, for example, generating fluid flow, altering the flow profile of an externally driven fluid, fractionating the sample into constituent parts, establishing or eliminating concentration gradients within the chamber, and the like. Surface properties that might have this effect can include, for example, post technology—whether static or actuated. The surface properties may also include microscale texture or topography in the surface, physical perturbation of the surface by vibration or deformation; electrical, electronic, and/or electromagnetic system on or in the surface; optically active (e.g., lenses) surfaces, such as embedded LEDs or materials that interact with external light sources; and the like.

The presently disclosed modular active surface devices include an active surface atop an active surface substrate, wherein the active surface atop the active surface substrate forms at least one surface of a reaction (or assay) chamber. Accordingly, the modular active surface devices for processing biological materials provide a reaction (or assay) chamber that has at least one active surface therein. The presently disclosed modular active surface devices can be provided in a variety of configurations and with a variety of features depending on the end-user requirements. In a simplest example, the modular active surface device includes the active surface mounted atop the active surface substrate, a mask mounted atop the active surface wherein the mask defines the area, height, and volume of the reaction chamber, and another substrate mounted atop the mask wherein this substrate provides the facing surface to the active surface. In other examples, both facing surfaces of the reaction chamber include the active surfaces with a space therebetween. Further, the modular active surface device can include other layers, such as, but not limited to, adhesive layers, stiffening layers for facilitating handling, and peel-off sealing layers.

In one example, the active surface is a micropost array layer (hereafter called the "micropost active surface layer") and the active surface substrate is a rigid or semi-rigid plastic substrate. In this example, the micropost array layer includes an array of surface-attached microposts (i.e., the micropost array). The micropost active surface can be provided in the reaction (or assay) chamber of the modular active surface devices. The application of a magnetic or electric field actuates the surface-attached microposts into movement. For example, the actuation occurs by contacting the reaction (or assay) chamber of the modular active surface devices with elements that provide an actuation force as described elsewhere herein, such as a magnetic or electric field. In this example, the micropost active surface in the reaction (or assay) chamber can be used for any purpose, such as, but not limited to, mixing operations, binding operations, cell processing operations (e.g., cell concentration, cell collection, cell filtration, cell washing, cell counting, cell recovery, cell lysis, and cell de-clumping), and the like.

Further disclosed herein is a large-scale manufacturing process by which the presently disclosed modular active surface devices can be mass produced and packaged. The large-scale manufacturing process can be, for example, a wafer-scale manufacturing process, a platter-scale manufacturing process, a roll-to-roll laser die cutting process, and the like. Once fabricated, individual modular active surface devices are shipped as drop-in modules to be installed in, for example, microfluidics cartridges or microfluidics systems. In another example, the individual modular active surface devices are shipped as drop-in modules to be installed in cartridges with gaseous input. In one example of a large-scale manufacturing process, a wafer is provided that includes row and columns of devices. The wafer is processed and then diced into individual modular active surface devices. In one example, the manufacturing process features a plasma bonding process to bond a micropost active surface to a plastic active surface substrate.

An aspect of the presently disclosed modular active surface devices for microfluidic systems and methods is that it provides a simple process for adding an active surface to a microfluidic cartridge or microfluidic system. For example, as compared with conventional microfluidic systems, this simplification may include, but is not limited to, reduced assembly costs, reduced number of mechanical components, the reduction or elimination of barriers to testing the active surface performance within the microfluidic system, and so on.

Figure 1B:
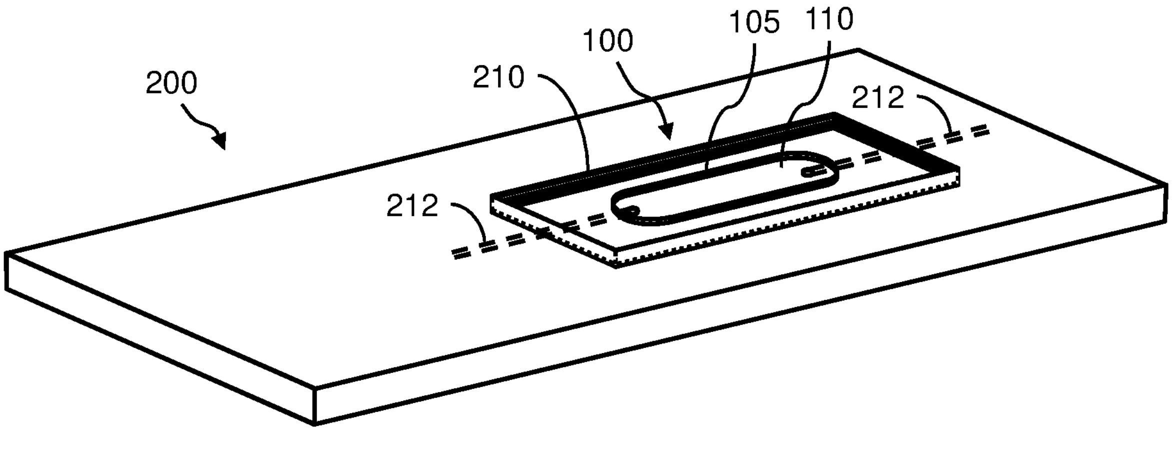

FIG. 1A and FIG. 1B illustrate an example of the presently disclosed modular active surface device 100 in relation to a fluidics cartridge 200. In this example, modular active surface device 100 provides a structure that includes a reaction chamber 105 that includes at least one active surface layer 110. Further, modular active surface device 100 includes fluid ports 112 (e.g., an input port and output port) in relation to reaction chamber 105. In this example, modular active surface device 100 provides a simple flow cell device. In another example, fluidics cartridge 200 may include fluid ports (e.g., an input port and output port, not shown).

Modular active surface device 100 is designed to drop-into a corresponding fluidics cartridge, such as fluidics cartridge 200. In this example, fluidics cartridge 200 includes a recessed region 210 for receiving modular active surface device 100. Namely, modular active surface device 100 is sized to be fitted into recessed region 210 of fluidics cartridge 200. Further, the positions of fluid ports 112 of modular active surface device 100 are set to correspond to fluid lines 212 in fluidics cartridge 200. In this way, modular active surface device 100 can be fluidly coupled to fluidics cartridge 200. An adhesive (e.g., a peel off adhesive layer, not shown) can be provided on the underside of modular active surface device 100 for easy installation and bonding to the surfaces of fluidics cartridge 200.

For illustration purposes only, the modular active surface device 100 and fabrication process described herein is based on micropost technology. Namely, as described herein, the active surface layer 110 is a "micropost" active surface layer 110 that includes a micropost array. However, modular active surface device 100 is not limited to a "micropost" active surface layer. This is exemplary only. Other types of active surfaces are possible.

Figure 2A:
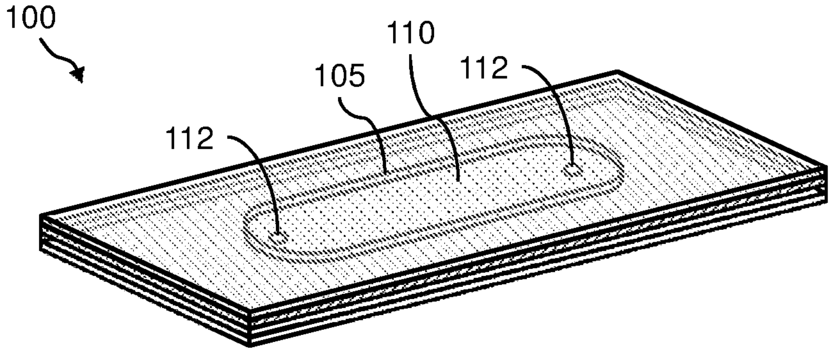
FIG. 2A illustrates an example of the presently disclosed modular active surface device in accordance with a simplest embodiment.
Figure 2B:
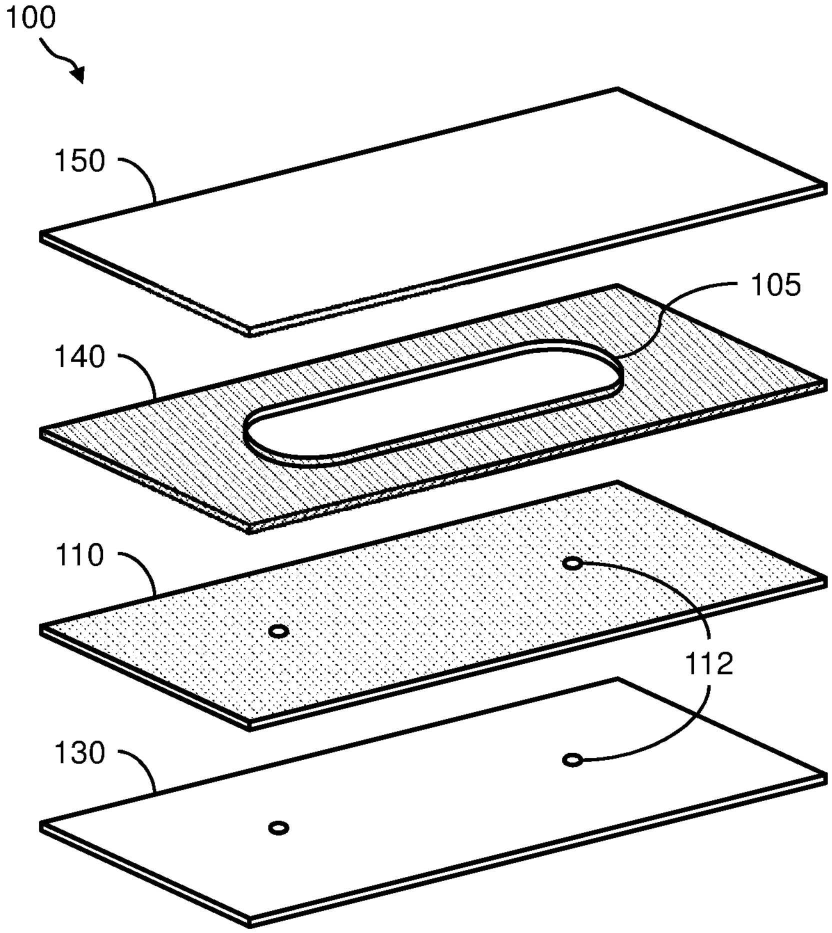
FIG. 2B illustrates an exploded view of the modular active surface device shown in FIG. 2A.
Figure 3A:
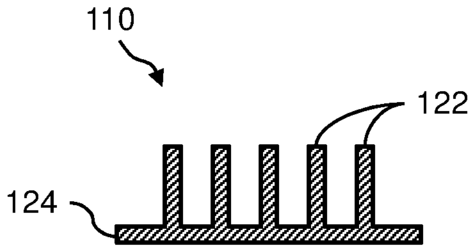
FIG. 3A and FIG. 3B illustrate side views of a portion of a micropost array layer of the presently disclosed modular active surface devices.
Figure 3B:
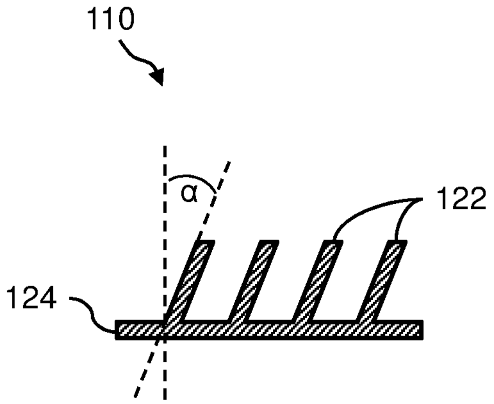

FIG. 2A shows a perspective view of an example of the presently disclosed modular active surface device 100 in accordance with a simplest embodiment. Again, modular active surface device 100 includes reaction chamber 105 with at least one active surface layer 110 and fluid ports 112. FIG. 2B shows an exploded view of the modular active surface device 100 shown in FIG. 2A. Namely, modular active surface device 100 includes active surface layer 110 mounted atop an active surface substrate 130, a mask layer 140 mounted atop active surface layer 110 wherein mask layer 140 defines the area, height, and volume of reaction chamber 105, and a substrate 150 mounted atop mask layer 140. In reaction chamber 105, substrate 150 provides the facing surface to active surface layer 110. In other examples, instead of substrate 150 facing the active surface layer 110, modular active surface device 100 can include two active surface layers 110 that face each other. Referring now to FIG. 3A and FIG. 3B, side views are shown of a portion of micropost active surface layer 110 of the presently disclosed modular active surface devices 100. Accordingly, micropost active surface layer 110 includes an arrangement of microposts 122 in a microarray on a substrate 124.

Micropost active surface layer 110 including an arrangement of microposts 122 on substrate 124 is based on, for example, the microposts described in the U.S. Pat. No. 9,238,869, as described elsewhere herein. An actuation force is generated in proximity to the micropost array that compels at least some of the microposts 122 to exhibit motion.

In one example, microposts 122 and substrate 124 of micropost active surface layer 110 can be formed of an active surface material, for example PDMS. Further, microposts 122 may include a flexible body and a metallic component disposed on or in the body, wherein application of a magnetic or electric field actuates microposts 122 into movement relative to the surface to which they are attached.

Referring still to FIG. 3A and FIG. 3B, microposts 122 and substrate 124 can be formed of an active surface material, for example PDMS. The length, diameter, geometry, orientation, and pitch of microposts 122 in the array can vary. For example, the length of microposts 122 can vary from about 1μηι to about 100μηι. The diameter of microposts 122 can vary from about 0.1μηι to about 10μηι. Further, the cross-sectional shape of microposts 122 can vary. For example, as described elsewhere herein, the cross-sectional shape of microposts 122 can be circular, ovular, square, rectangular, triangular, and so on. The orientation of microposts 122 can vary. For example, FIG. 3A shows microposts 122 oriented substantially normal to the plane of substrate 124, while FIG. 3B shows microposts 122 oriented at an angle α with respect to normal of the plane of substrate 124. In a neutral position with no actuation force applied, the angle a can be, for example, from about 0 degrees to about 45 degrees.

Figure 4A:
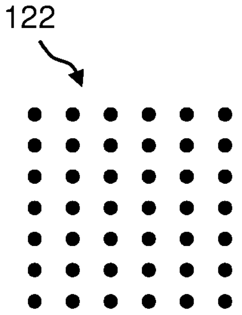
FIG. 4A through FIG. 4D illustrate plan views of examples of micropost arrays.
Figure 4B:
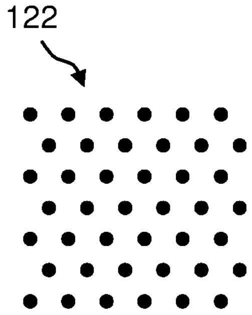
Figure 4C:
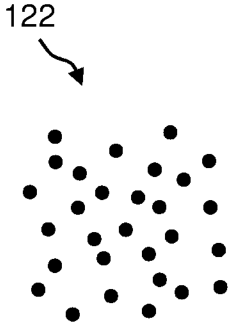
Figure 4D:
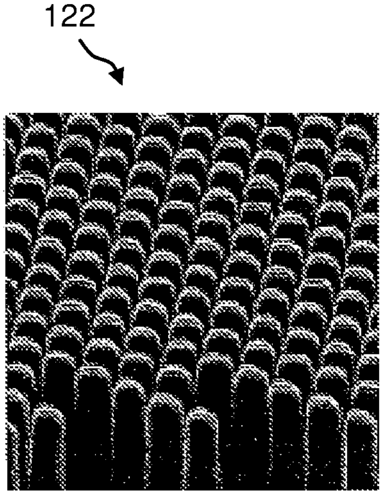

Additionally, the pitch of microposts 122 within the array can vary, for example, from about 0μηι to about 50μηι. Further, the relative positions of microposts 122 within the array can vary. For example, FIG. 4A shows microposts 122 aligned uniformly in rows and columns, while FIG. 4B shows microposts 122 in staggered or offset rows and/or columns. In another example and referring now to FIG. 4C, microposts 122 can be positioned randomly but with the density controlled. For example, 4µηι-diameter microposts 122 spaced randomly, but with a controlled density of, for example, about $10^5$ microposts/$cm^2$, with 30× higher or 100× lower being a reasonable range. FIG. 4D shows a scanning electron microscope image of an example of an array of microposts 122.

Figure 5A:
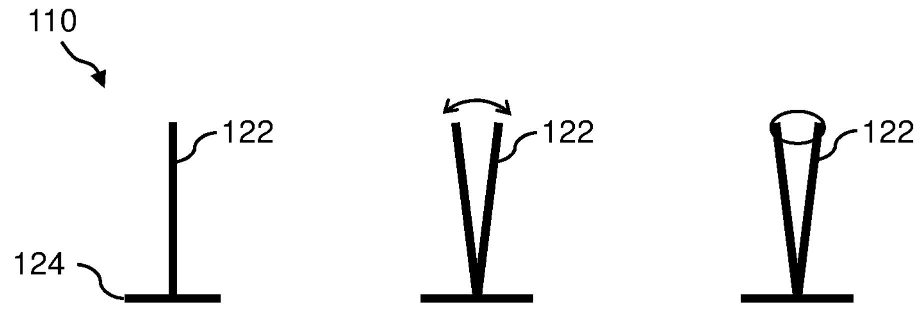
FIG. 5A and FIG. 5B illustrate side views of a micropost and show examples of the actuation motion thereof.
Figure 5B:
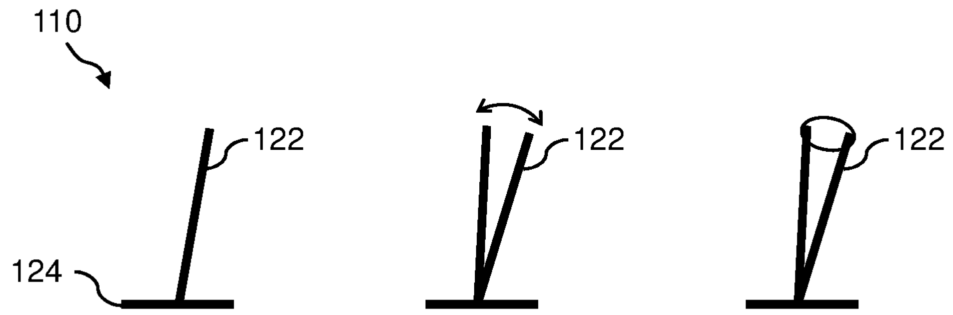

FIG. 5A and FIG. 5B illustrate sides views of a micropost 122 and show examples of the actuation motion thereof. Namely, FIG. 5A shows an example of a micropost 122 oriented substantially normal to the plane of substrate 124. FIG. 5A shows that the distal end of the micropost 122 can move (1) with side-to-side 2D motion only with respect to the fixed proximal end or (2) with circular motion with respect to the fixed proximal end, which is a cone-shaped motion. By contrast, FIG. 5B shows an example of a micropost 122 oriented at an angle with respect to the plane of substrate 124. FIG. 5B shows that the distal end of the micropost 122 can move (1) with tilted side-to-side 2D motion only with respect to the fixed proximal end or (2) with tilted circular motion with respect to the fixed proximal end, which is a tilted cone-shaped motion. In modular active surface devices 100, by actuating microposts 122 and causing motion thereof, any fluid in reaction chamber 105 is in effect stirred or caused to flow or circulate within the gap inside reaction chamber 105 and across the surface area thereof.

Figure 6:
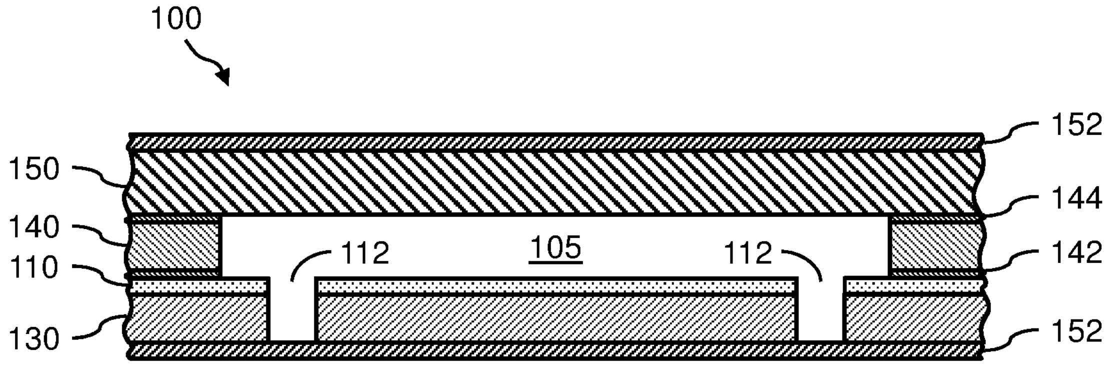
FIG. 6, FIG. 7, and FIG. 8 illustrate side views of other examples of the presently disclosed modular active surface devices.
Figure 7:
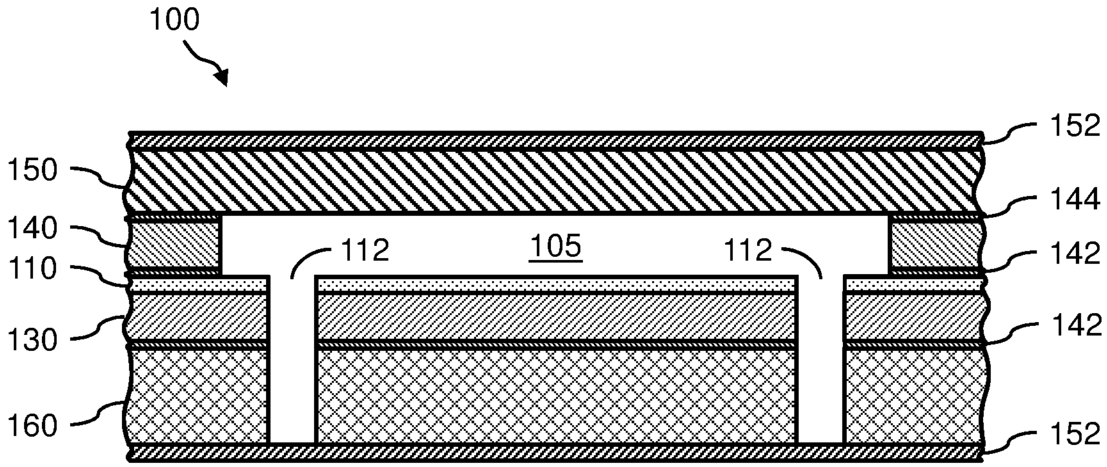
Figure 8:
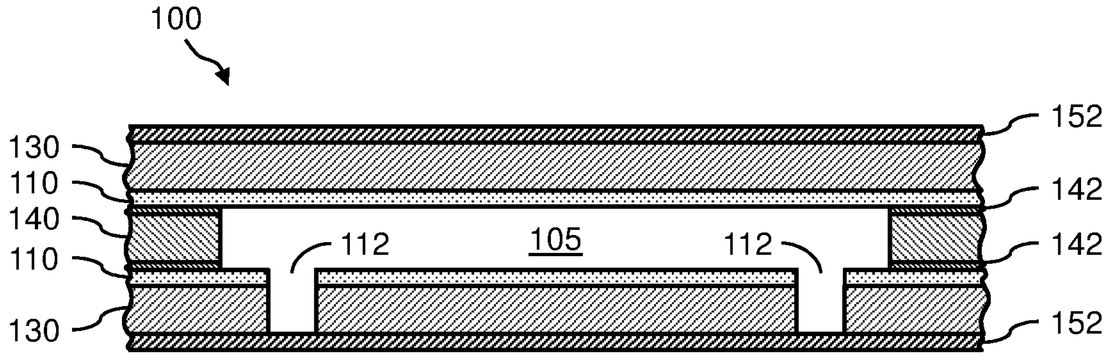

FIG. 6, FIG. 7, and FIG. 8 illustrate side views of other examples of the presently disclosed modular active surface devices 100. In all cases, the individual modular active surface device 100 shown is one device only, which has been formed in a large-scale manufacturing process that includes, for example, a wafer that is diced into multiple modular active surface devices 100.

In the example shown in FIG. 6, modular active surface device 100 includes micropost active surface layer 110, as described with reference to FIG. 3A through 5B. Namely, microposts 122 (not visible in FIG. 6) of micropost active surface layer 110 are extending into reaction chamber 105. Micropost active surface layer 110 is mounted atop active surface substrate 130. Active surface substrate 130 can be a rigid or semi-rigid substrate formed, for example, of glass, plastic, silicon, or silicone. In one example, active surface substrate 130 is a plastic substrate, such as a substrate formed of the semi-rigid Melinex® brand polyester film available from DuPont Teijin Films (Chester, VA). The thickness of the Melinex® active surface substrate 130 can be from about 100µηι to about 500µηι in one example, or is about 250µηι in another example. Further, through-holes in micropost active surface layer 110 and active surface substrate 130 form fluid ports 112 (e.g., an input port and output port) in relation to reaction chamber 105.

Some determining characteristics of active surface substrate 130 can include, for example, optical transparency, thickness, rigidity, flexibility, whether passive or active (e.g., electrodes, magnets, LEDs, micropost actuation mechanisms, micropost motion detection mechanisms, etc.), and/or function. Function can be, for example, magnetic applications (e.g., generating a magnetic field via embedded wires or coils, magnetic sensors such as a Hall Effect sensors), optical sensor applications, and/or illumination applications.

Further, a plasma bonding process is disclosed herein for bonding micropost active surface layer 110, which is an active surface material such as PDMS, to active surface substrate 130, which is plastic. This plasma bonding process has certain advantages over using an adhesive to bond the active surface material micropost active surface layer 110 to the plastic active surface substrate 130. More details of this plasma bonding process are shown and described hereinbelow with reference to FIG. 19.

Mask layer 140 that is mounted atop micropost active surface layer 110 can be, for example, a plastic mask. The thickness of mask layer 140 can be from about 50µηι to about 1,000µηι in one example, or is about 150µηι in another example. Again, openings in mask layer 140 can define certain features of modular active surface devices 100, such as the area, height, and volume of reaction chamber 105. Examples of other features that can be formed using mask layer 140 are shown hereinbelow with reference to FIG. 22A and FIG. 22B. Further, modular active surface devices 100 are not limited to one reaction chamber only. Modular active surface devices 100 can includes multiple reaction chambers, an example of which shown hereinbelow with reference to FIG. 23A and FIG. 23B.

Substrate 150 that is mounted atop mask layer 140 can be, for example, a plastic, glass, or silicon substrate. In this example, substrate 150 performs two functions (1) to work in combination with micropost active surface layer 110 to form reaction chamber 105 and (2) to protect microposts 122 of micropost active surface layer 110 when modular active surface device 100 is handled. In one example, substrate 150 is formed of polyethylene terephthalate (PET). The thickness of the PET substrate 150 can be from about 100µηι to about 500µηι in one example, or is about 380µηι (15 mils) in another example. Together, the stack of micropost active surface layer 110, then mask layer 140, then substrate 150 form reaction chamber 105, wherein mask layer 140 serves as the spacer between micropost active surface layer 110 and substrate 150 that determines the height of reaction chamber 105. In some embodiments, the surface of substrate 150 facing reaction chamber 105 can be functionalized. In one example, substrate 150 can be a microarray. A microarray can be, for example, a 2D array of capture elements immobilized on a solid substrate that assays large amounts of biological material using high-throughput screening miniaturized, multiplexed and parallel processing, and detection methods.

Additionally, an adhesive layer 142 is provided on one side of mask layer 140 for bonding to micropost active surface layer 110. In one example, adhesive layer 142 is ARcare 90445, which has a clear peelable liner. An adhesive layer 144 is provided on the other side of mask layer 140 for bonding to substrate 150. In one example, adhesive layer 144 is ARcare 90106, which has a white peelable liner. Adhesive layer 142 and adhesive layer 144 are "pressure sensitive" adhesives, meaning they require pressure only (no solvents, heat, UV, etc.) to make the bond. In another embodiment, mask layer 140 can exist as a single layer of transfer adhesive (i.e., an adhesive layer that is sticky on both top and bottom surfaces).

For shipping and handling, the outermost layers/surfaces of modular active surface device 100 are protected by a thin textured laminate; namely, protective layers 152. Each of the protective layers 152 is a liner with an adhesive that adheres strongly to the liner and weakly to modular active surface device 100. Protective layers 152 provide a sealed structure when diced from the wafer. One or both protective layers 152 can be peeled off for installing modular active surface device 100 into, for example, a receiving fluidics cartridge 200. For example, the protective layer 152 on the outer surface of substrate 150 can be peeled away in order to bond the substrate 150-side of modular active surface device 100 to the end user's substrate. Further, the protective layer 152 on the outer surface of active surface substrate 130 can be peeled away when access to reaction chamber 105 is needed; namely, to expose fluid ports 112. Additionally, when in use, modular active surface device 100 can have any orientation depending on the end user's system. Namely, modular active surface device 100 can be oriented substrate 150-side up or active surface substrate 130-side up.

In the example shown in FIG. 7, modular active surface device 100 is substantially the same as the modular active surface device 100 shown in FIG. 6 except for the addition of a support layer 160 to provide additional rigidity and strength to the structure. Namely, support layer 160 is bonded to active surface substrate 130 via another adhesive layer 142 (e.g., ARcare 90445). In one example, support layer 160 is a thick layer of acrylic, also with the through-holes (i.e., fluid ports 112). The thickness of the acrylic support layer 160 can be from about 500μηι to about 5 mm in one example, or is about 800μηι(1/32 inches) in another example. One function of support layer 160 is to be thick and rigid enough to interface with a pipette without damaging reaction chamber 105. Therefore, the thickness of support layer 160 may be determined by a specific function or purpose.

The modular active surface devices 100 shown in FIG. 6 and FIG. 7 are examples of devices that include microposts 122 on one surface only of reaction chamber 105. However, the modular active surface device 100 shown in FIG. 8 is an example of a device that includes microposts 122 on both surfaces of reaction chamber 105. Accordingly, the modular active surface device 100 shown in FIG. 8 is substantially the same as the modular active surface device 100 shown in FIG. 6 except that substrate 150 is replaced with another instance of micropost active surface layer 110 and active surface substrate 130. The two active surface layers 110 face each other on opposite sides of reaction chamber 105. Optionally, a support layer 160 (not shown) can be provided on one or both sides of the modular active surface device 100 shown in FIG. 8.

FIG. 9A through FIG. 17 show examples of certain steps of a process of mass producing the presently disclosed modular active surface devices 100 via a wafer-scale manufacturing process. However, more details of a wafer-scale method of mass producing the presently disclosed modular active surface devices 100 is shown and described hereinbelow with reference to FIG. 18. Further, the process steps shown in FIG. 9A through FIG. 17 are not limited to wafer-scale manufacturing only. The process steps shown in FIG. 9A through FIG. 17 are equally applicable to other manufacturing processes, such as platter-scale manufacturing processes (e.g., using 60-inch glass panels), roll-to-roll laser die cutting processes (e.g., using 10-meter long rolls), and the like.

Figure 9A:
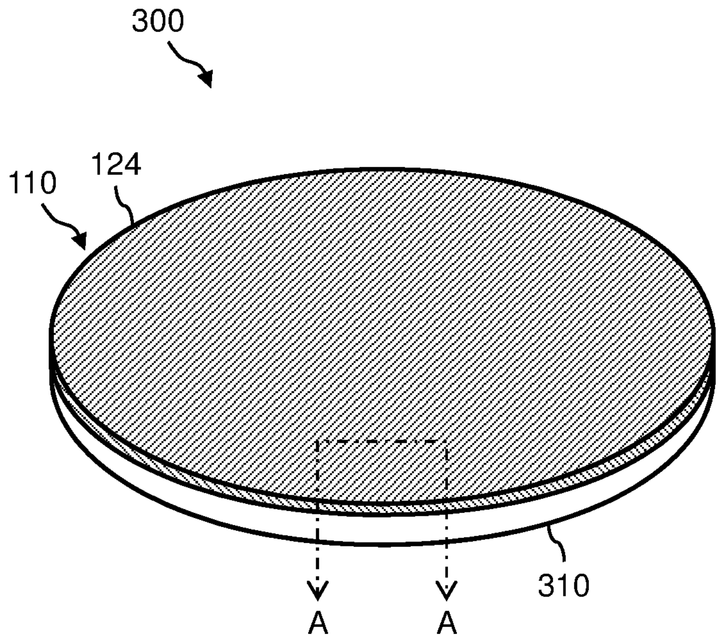
FIG. 9A through FIG. 17 show an example of a process of mass producing the presently disclosed modular active surface devices.
Figure 9B:
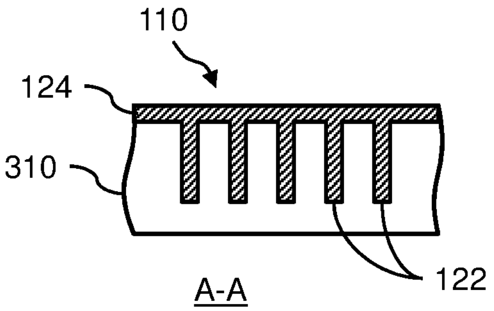

In an initial step of the fabrication process of the presently disclosed modular active surface devices 100, the micropost active surface layer 110 is provided with its microposts 122 embedded in a substrate, as described herein and in U.S. Pat. No. 9,238,869. For example, FIG. 9A shows a perspective view of an example of an active surface material-filled substrate 300 (for example, a PDMS-filled substrate). Active surface material-filled substrate 300 includes the active surface material microposts 122 of micropost active surface layer 110 embedded in a substrate 310. FIG. 9B shows a cross-sectional view of active surface material-filled substrate 300 taken along line A-A of FIG. 9A. As described in U.S. Pat. No. 9,238,869, substrate 310 provides a template or platform for forming microposts 122 and substrate 124 (see FIG. 3A through FIG. 5B).

Figure 10A:
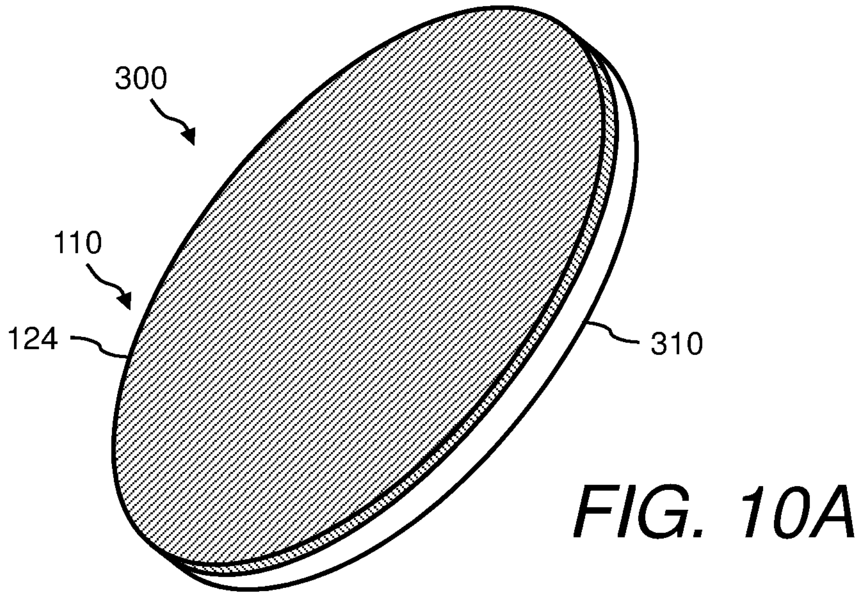
Figure 10B:
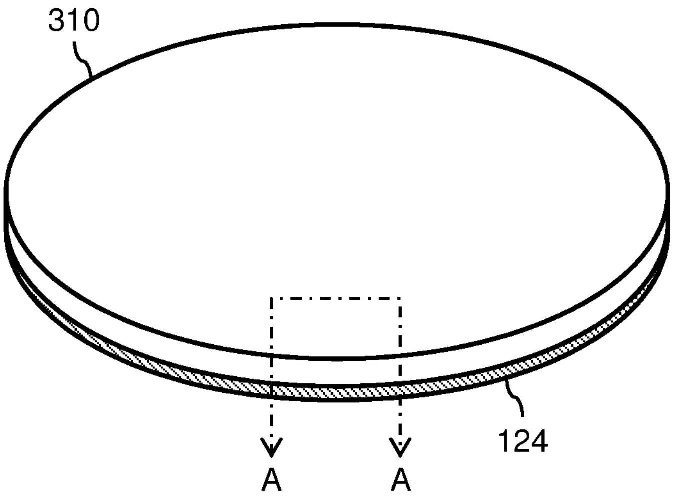
Figure 10C:
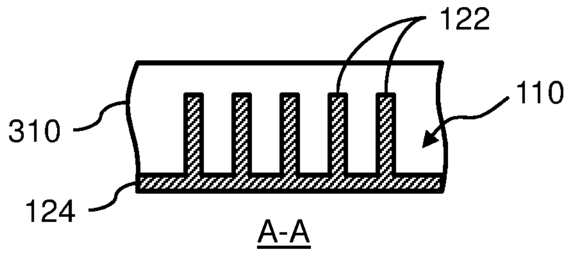

In one example, substrate 310 is a polycarbonate (PC) substrate in which the active surface material microposts 122 are embedded (for example, wherein the active surface material may include, but is not limited to PDMS). Other materials may be used to form flexible microposts 122. Active surface material-filled substrate 300 means that the PC substrate 310 is "filled" with the active surface material microposts 122, for example PDMS microposts. Substrate 310 is a "sacrificial" substrate that will be removed in subsequent process steps in the fabrication of the modular active surface devices 100. Active surface material-filled substrate 300 can be, for example, a 6-inch or 12-inch diameter substrate. FIG. 10A and FIG. 10B show a process of orienting active surface material-filled substrate 300 with substrate 124 of micropost active surface layer 110 facing downward and substrate 310 facing upward. FIG. 10C shows a cross-sectional view of active surface material-filled substrate 300 taken along line A-A of FIG. 10B and in the fully oriented position.

Figure 11A:
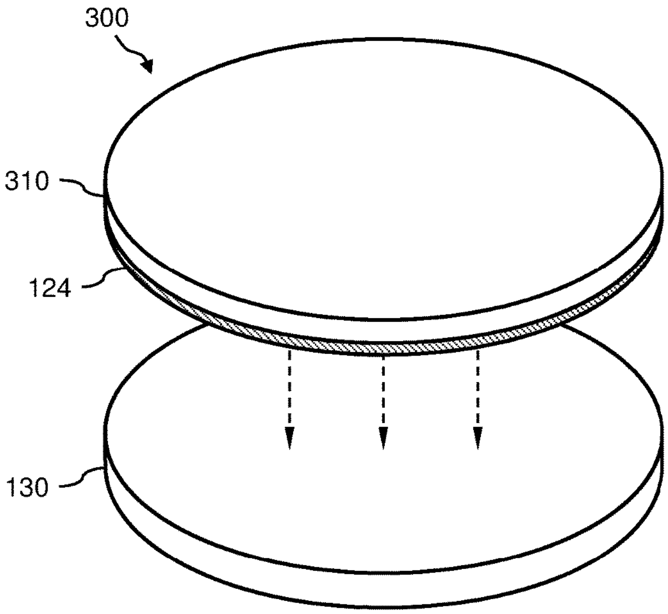
Figure 11B:
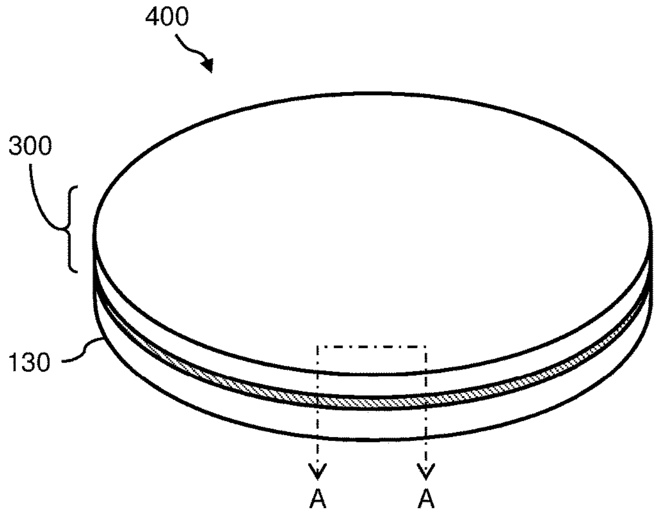
Figure 11C:
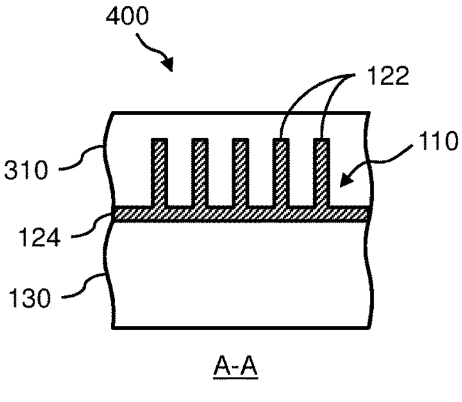

Next, FIG. 11A and FIG. 11B show a process of bonding active surface material-filled substrate 300 to active surface substrate 130 to form an active surface wafer 400. Namely, the substrate 124-side of active surface material-filled substrate 300 is bonded to active surface substrate 130 using a plasma bonding process, as described hereinbelow with reference to FIG. 19. FIG. 11C shows a cross-sectional view of active surface wafer 400 taken along line A-A of FIG. 11B. Namely, active surface wafer 400 includes active surface substrate 130, then micropost active surface layer 110 atop active surface substrate 130, then the active surface material microposts 122 of micropost active surface layer 110 embedded in substrate 310. Active surface wafer 400 can be, for example, a 6-inch or 12-inch diameter wafer.

Figures 12A, 12B:
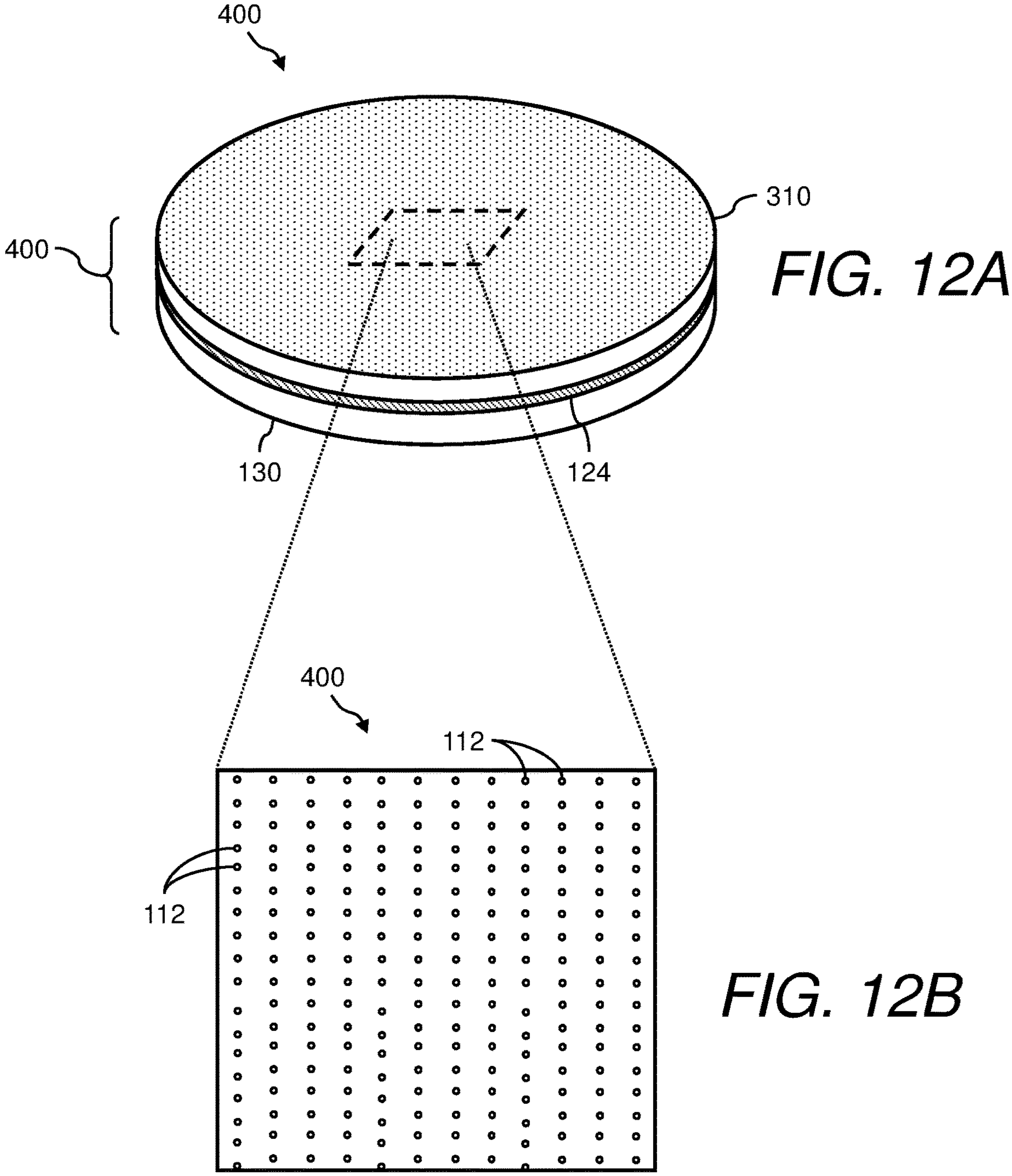

Next, FIG. 12A and FIG. 12B show active surface wafer 400 with a plurality of fluid ports 112 (i.e., through-holes) cut therein to form a cut active surface wafer 400. FIG. 12B shows a plan view of a portion of the cut active surface wafer 400.

Figure 13A:
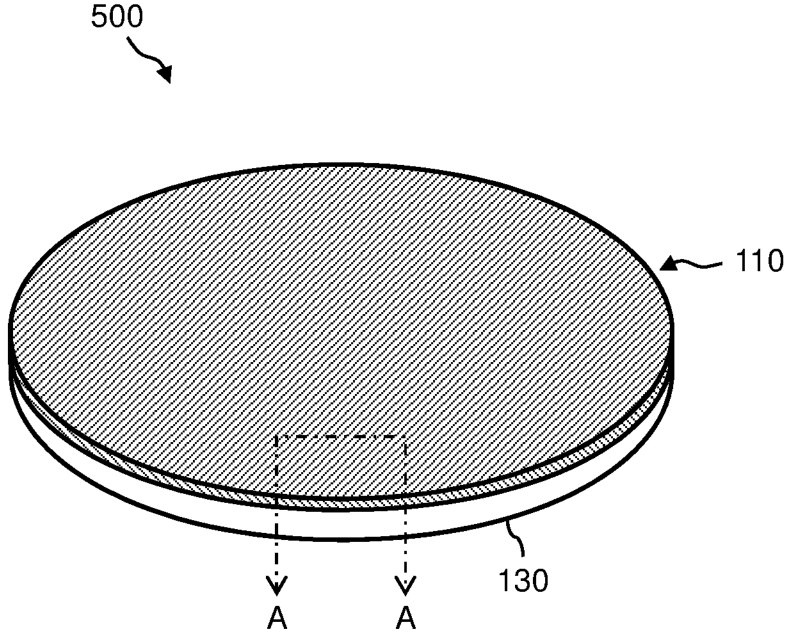
Figure 13B:
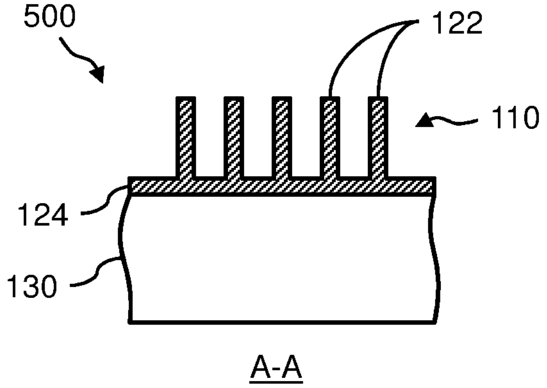

Next, FIG. 13A and FIG. 13B show a released active surface wafer 500. As used herein, "released" means that the substrate 310 in which microposts 122 of micropost active surface layer 110 are embedded has been removed. In this way, microposts 122 are freestanding atop active surface substrate 130 and able to be actuated. In released active surface wafer 500, the fluid ports 112 (i.e., through-holes) are present but not shown. FIG. 13B shows a cross-sectional view of released active surface wafer 500 taken along line A-A of FIG. 13B. Released active surface wafer 500 has a substantially continuous field or array of released (i.e., free-standing) microposts 122 across its area. Released active surface wafer 500 can be, for example, a 6-inch or 12-inch diameter wafer.

Figure 14:
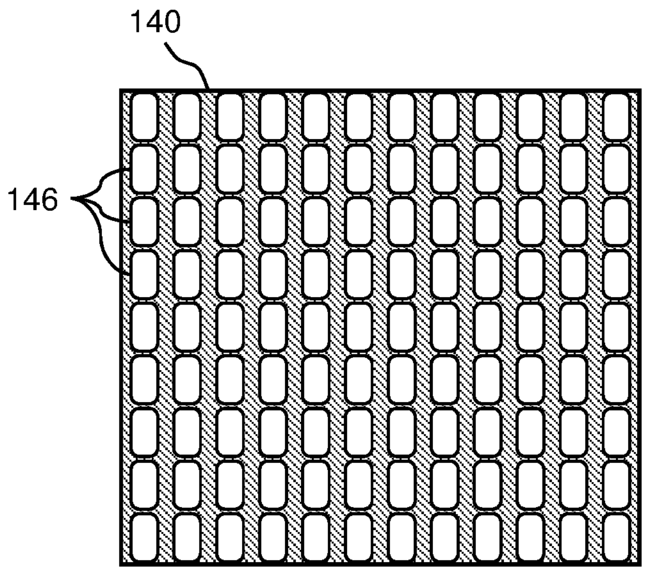

Next, FIG. 14 shows a plan view an example of mask layer 140 for forming the presently disclosed modular active surface devices 100. The portion of mask layer 140 shown in FIG. 14 corresponds to the portion of cut active surface wafer 400 shown in FIG. 12B. In this example, mask layer 140 has openings 146 arranged in rows and columns, wherein the openings 146 will become the reaction chambers 105 of the respective modular active surface devices 100 when fully formed.

Figure 15:
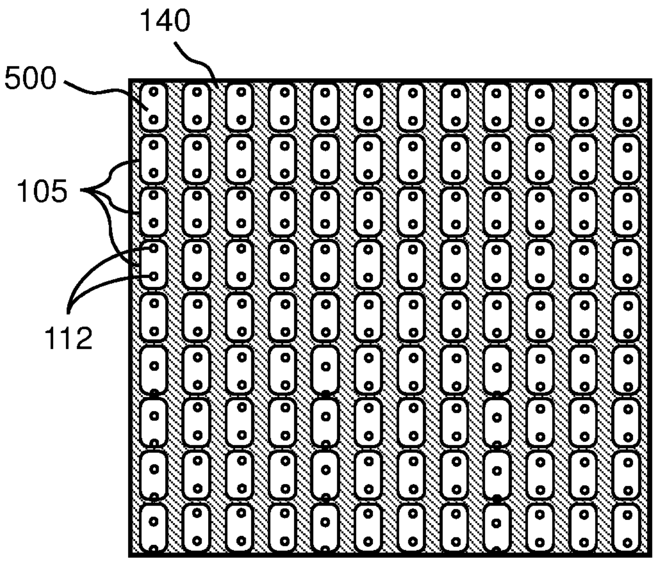

Next, FIG. 15 shows mask layer 140 atop and in relation to released active surface wafer 500 for forming the presently disclosed modular active surface devices 100. Again, the portion of mask layer 140 and released active surface wafer 500 shown in FIG. 15 corresponds to the portion of cut active surface wafer 400 shown in FIG. 12B. Further, each opening 146 of mask layer 140 corresponds to the reaction chamber 105 of an eventual modular active surface device 100. According, FIG. 15 shows each opening 146 of mask layer 140 substantially aligned with a pair of fluid ports 112 in released active surface wafer 500.

Mask layer 140 is adhered (pressure-fitted) to the micropost 122-side of released active surface wafer 500. Because released active surface wafer 500 has a continuous field or array of released microposts 122, the structural members that form mask layer 140 will crush certain microposts 122 atop released active surface wafer 500, leaving intact only those free-standing microposts 122 landing inside openings 146 of mask layer 140.

Figure 16:
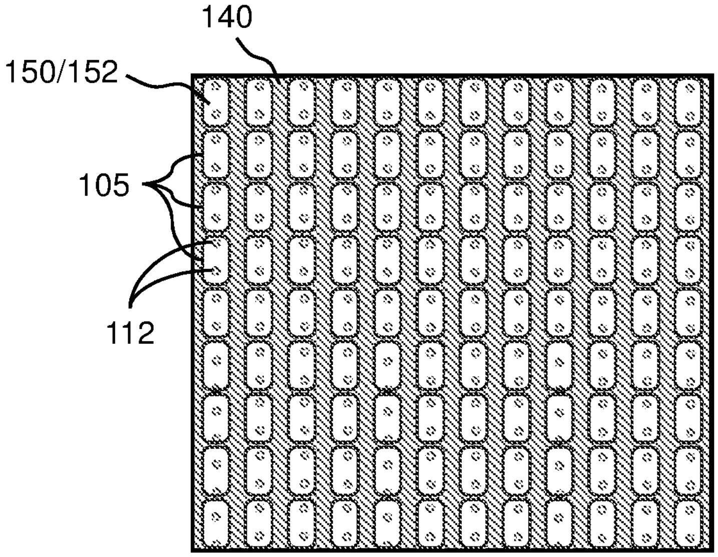
Figure 17:
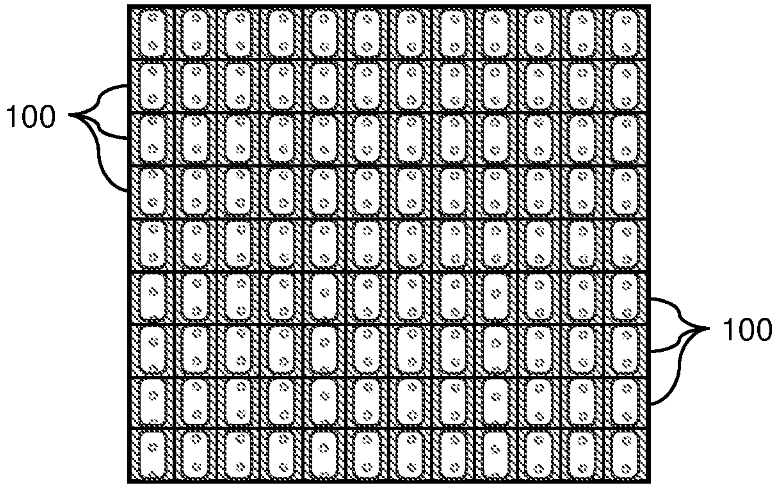

Next, FIG. 16 shows certain protective layers added to the released active surface wafer 500 and mask layer 140 structure. Again, the portion of wafer structure shown in FIG. 16 corresponds to the portion of cut active surface wafer 400 shown in FIG. 12B. In this step, the PET substrate 150 and a protective layer 152 are added atop mask layer 140. Further, another protective layer 152 is added on the underside of released active surface wafer 500 (e.g., on the outer surface of active surface substrate 130). In this state, the wafer structure is sealed and ready for dicing into individual modular active surface devices 100. For example, FIG. 17 shows the wafer structure diced into multiple individual modular active surface devices 100.

Figure 18:
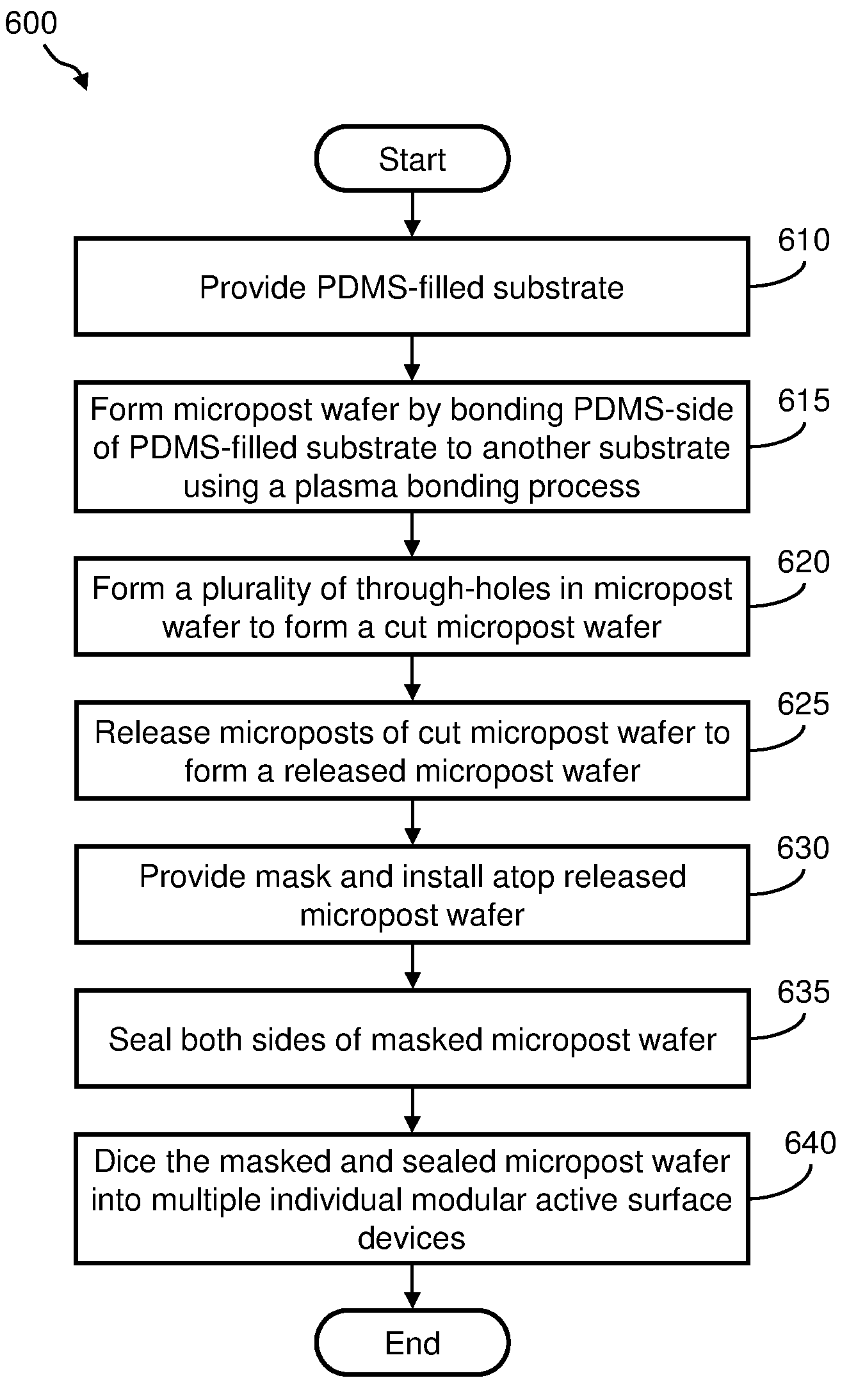
FIG. 18 illustrates a flow diagram of an example of a wafer-scale method of mass producing the presently disclosed modular active surface devices.

FIG. 18 illustrates a block diagram of an example of a method 600 of mass producing the presently disclosed modular active surface devices 100. For example, method 600 supports a wafer-scale manufacturing process for making the presently disclosed modular active surface devices 100. However, the process steps of method 600 are not limited to wafer-scale manufacturing only. The process steps of method 600 are equally applicable to other manufacturing processes, such as platter-scale manufacturing processes (e.g., using 60-inch glass panels), roll-to-roll laser die cutting processes (e.g., using 10-meter long rolls), and the like. Method 600 may include, but is not limited to, the following steps.

At a step 610, a active surface material-filled substrate is provided. For example and referring now again to FIG. 9A and FIG. 9B, the active surface material-filled substrate 300 is provided that includes the active surface material microposts 122 of micropost active surface layer 110 embedded in substrate 310 (e.g., a polycarbonate substrate 310). The active surface material-filled substrate 300 can be, for example, a 6-inch or 12-inch diameter substrate.

At a step 615, the active surface wafer 400 is formed by bonding the active surface material-side of the active surface material-filled substrate 300 to another substrate using a plasma bonding process. For example and referring now again to FIG. 10A through FIG. 11C, the active surface wafer 400 is formed by bonding the active surface material substrate 124-side of the active surface material-filled substrate to a plastic active surface substrate 130 (e.g., the Melinex® active surface substrate 130) using the plasma bonding process described hereinbelow with reference to FIG. 19. The active surface wafer 400 can be, for example, a 6-inch or 12-inch diameter wafer.

At a step 620, a plurality of through-holes are formed in active surface wafer 400 to form a cut active surface wafer 400. For example and referring now again to FIG. 12A and FIG. 12B, a plurality of through-holes (i.e., fluid ports 112) are formed in active surface wafer 400 using standard etching processes. The cut active surface wafer 400 can be, for example, a 6-inch or 12-inch diameter wafer.

At a step 625, the released active surface wafer 500 is formed by releasing the microposts 122 of the cut active surface wafer 400 as shown, for example, in FIG. 13A and FIG. 13B. Namely, substrate 310 of the original active surface material-filled substrate 300 (step 610) in which the active surface material microposts 122 are embedded is removed. In one example, substrate 310 is removed using a solvent, leaving behind the released microposts 122 atop active surface substrate 130, wherein the released microposts 122 are extending outwards away from active surface substrate 130. In so doing, the released active surface wafer 500 is formed. The released active surface wafer 500 can be, for example, a 6-inch or 12-inch diameter wafer.

At a step 630, a mask is provided and installed atop the released active surface wafer 500. For example and referring now again to FIG. 14 and FIG. 15, mask layer 140 provided and installed atop the released active surface wafer 500 with openings 146 positioned in relation to the through-holes (i.e., fluid ports 112) to form the eventual reaction chambers 105.

At a step 635, both sides of the masked active surface wafer are sealed. For example and referring now again to FIG. 16, the PET substrate 150 and then the first protective layer 152 are installed atop mask layer 140, thereby sealing the eventual reaction chambers 105. Further, the second protective layer 152 is installed on the underside of released active surface wafer 500 (e.g., on the outside surface of active surface substrate 130), thereby sealing the through-holes which are the eventual fluid ports 112. Optionally, a support layer (e.g., support layer 160 shown in FIG. 7) is provided on the underside of released active surface wafer 500 (e.g., on the outer surface of active surface substrate 130), then the second protective layer 152 is installed on the outside surface of the support layer.

At a step 640, the masked and sealed active surface wafer is diced into multiple individual modular active surface devices 100 using, for example, a laser cutting process, as shown for example, in FIG. 17.

Figure 19:
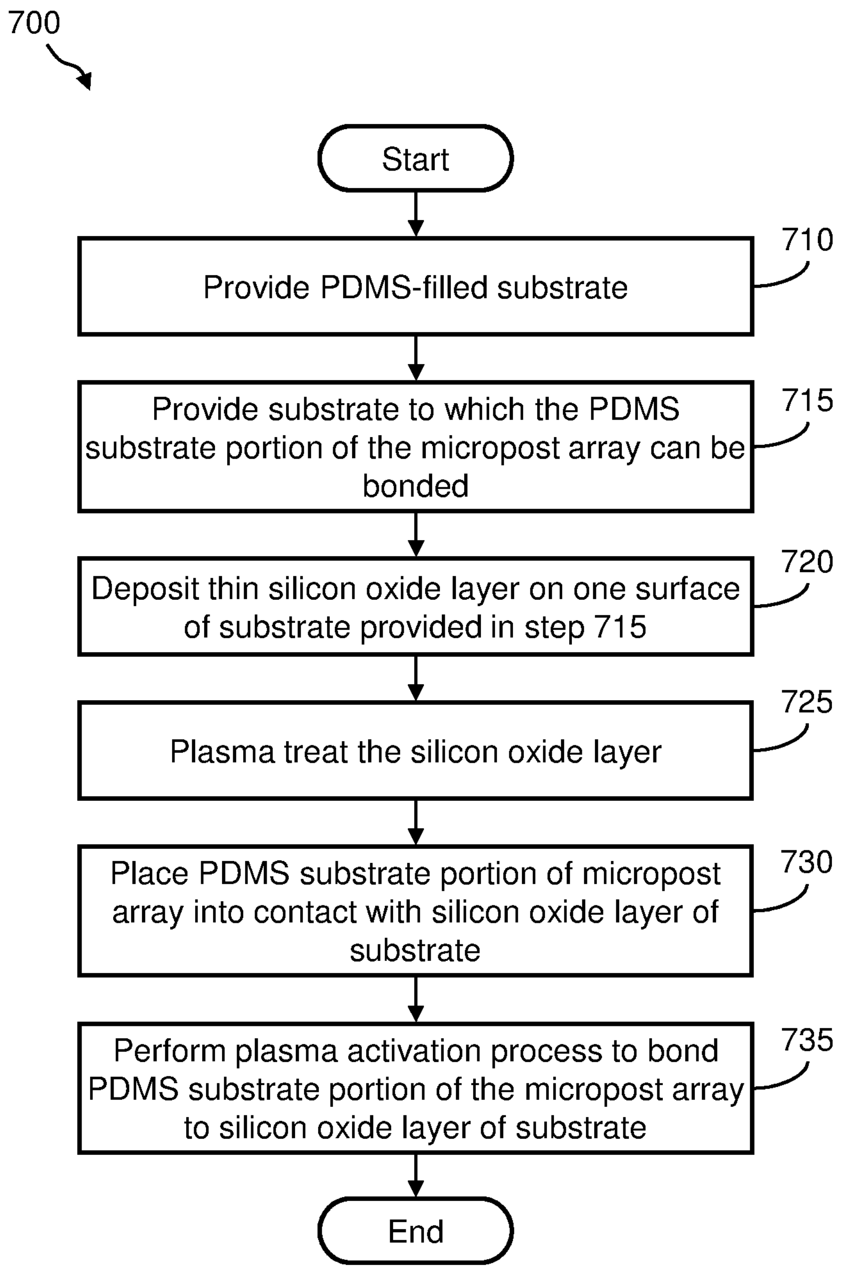
FIG. 19 illustrates a flow diagram of an example of a method of using a plasma bonding process to bond the micropost array to a substrate.

In one example, in the presently disclosed modular active surface devices 100, the active surface material substrate 124-portion of micropost active surface layer 110 can be bonded to, for example, the plastic (e.g., Melinex®) active surface substrate 130 using an adhesive, such as ARclad® IS-7876. However, an adhesive bond runs risk of failing during the process of releasing microposts 122 in step 625 of method 600 of FIG. 18 and causing the active surface material micropost active surface layer 110 and the plastic active surface substrate 130 to delaminate. Accordingly, in another example, FIG. 19 shows a block diagram of an example of a method 700 of using a plasma bonding process to bond the micropost array to a substrate. Method 700 may be used, for example, in step 615 of method 600 of FIG. 18.

For example, according to method 700 a plasma bonding process is used to bond the active surface material substrate 124-portion of micropost active surface layer 110 to the plastic (e.g., Melinex®) active surface substrate 130. The benefit of using the plasma bonding process of method 700 is that it mitigates the delamination risk of using an adhesive bond. That is, the plasma bond can tolerate the process of releasing the microposts 122 that is described in step 625 of method 600 of FIG. 18, whereas an adhesive bond may not. Another benefit of the plasma bonding process over using an adhesive is good chemical compatibility. Method 700 supports a large-scale manufacturing process for making the presently disclosed modular active surface devices 100. Method 700 may include, but is not limited to, the following steps.

At a step 710, an active surface material-filled substrate is provided. For example and referring now again to FIG. 9A and FIG. 9B, the active surface material-filled substrate 300 is provided that includes the active surface material microposts 122 of micropost active surface layer 110 embedded in substrate 310 (e.g., a polycarbonate substrate 310). The active surface material substrate 124 of micropost active surface layer 110 forms one side of the active surface material-filled substrate 300. The outer surface of substrate 310 forms the other side of the active surface material-filled substrate 300, wherein substrate 310 is a sacrificial substrate. The active surface material-filled substrate 300 can be, for example, a 6-inch or 12-inch diameter substrate.

At a step 715, a substrate is provided to which the active surface material substrate 124-portion of micropost active surface layer 110 can be bonded. In one example, the substrate (e.g., active surface substrate 130) is the semi-rigid Melinex® brand polyester film available from DuPont Teijin Films (Chester, VA). The thickness of the Melinex® active surface substrate 130 can be from about 100μηι to about 500μηι in one example, or is about 250μηι in another example. The substrate (e.g., active surface substrate 130) can be, for example, a 6-inch or 12-inch diameter substrate.

At a step 720, a thin silicon oxide layer is deposited on one surface of the substrate (e.g., active surface substrate 130) provided in step 715. For example, the silicon oxide layer is formed atop the plastic active surface substrate 130 using a plasma-enhanced chemical vapor deposition (PECVD) process. In one example, the silicon oxide layer is about 0.1μηι thick. Essentially, in this step, a thin film of glass is deposited on a plastic substrate. Further, because, for example, the Melinex® substrate cannot handle high temperatures, a low-temperature PECVD process (e.g., from about 30° C. to about 70° C.) is used.

At a step 725, the silicon oxide layer is plasma-treated. For example, the silicon oxide layer on the plastic active surface substrate 130 (e.g., the Melinex® substrate) is plasma-treated using standard processes.

At a step 730, the active surface material substrate 124-portion of micropost active surface layer 110 is put into contact with the silicon oxide layer of the active surface substrate 130 (e.g., the Melinex® substrate).

At a step 735, a plasma activation process is performed to bond the active surface material substrate 124-portion of micropost active surface layer 110 to the silicon oxide layer of the active surface substrate 130 (e.g., the Melinex® substrate).

Generally, in method 600 of FIG. 18 and method 700 of FIG. 19, the size and features of modular active surface devices 100 is based on the requirements of the end user. For example, a modular active surface device 100 can have any x/y dimensions and thickness, and the reaction chamber 105 can be any area, height, and shape. In operation, once an individual modular active surface device 100 is formed according, for example, to methods 600, 700, and according to the requirements of the end user, the device is shipped to the end user. Once the modular active surface device 100 is received by the end user, one or both protective layers 152 can be peeled off, thereby exposing at least one surface that can be easily adhered to the end user's fluidics cartridge (e.g., fluidics cartridge 200). Accordingly, the presently disclosed modular active surface devices 100 make integrating an active surface, which can be complex, into a low cost fluidics cartridge very easy and inexpensive.

Figure 20:
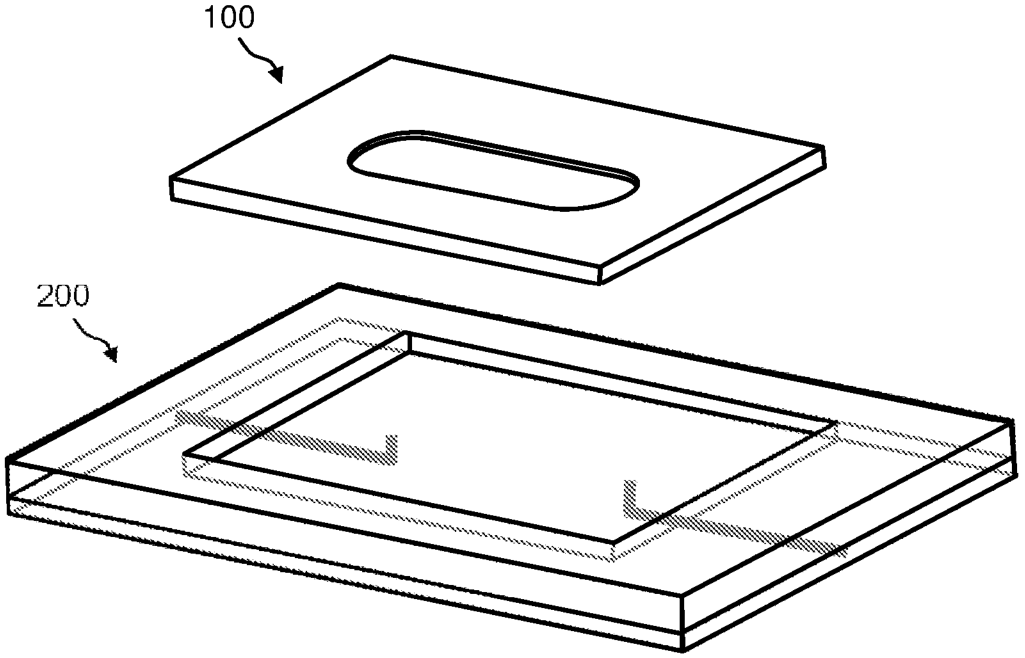
FIG. 20 and FIG. 21 illustrate perspective views of other examples of the presently disclosed modular active surface device in relation to a fluidics cartridge.
Figure 21:
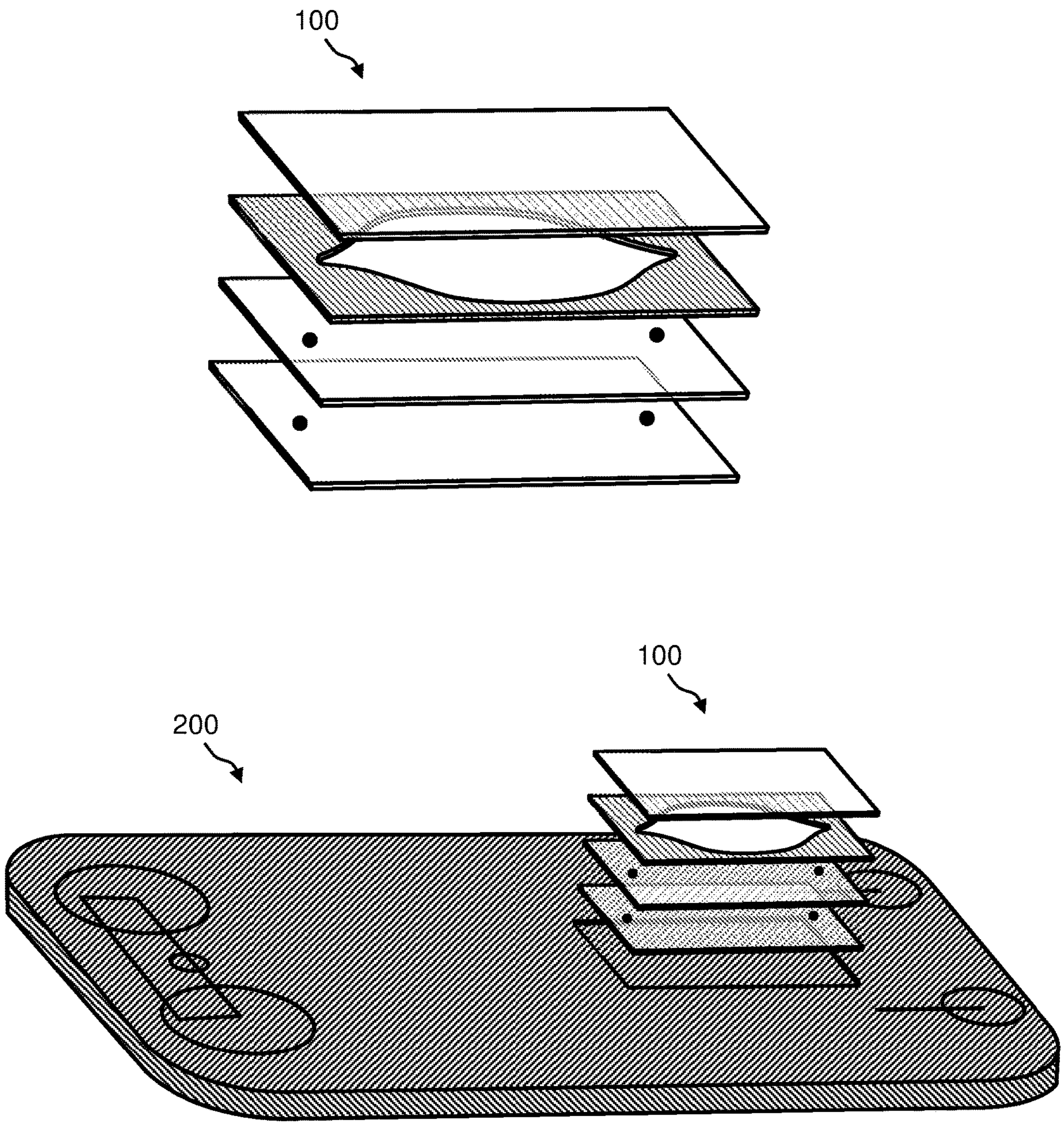

FIG. 20 and FIG. 21 illustrate perspective views of other examples of the presently disclosed modular active surface devices 100 in relation to corresponding fluidics cartridges 200.

Figure 22A:
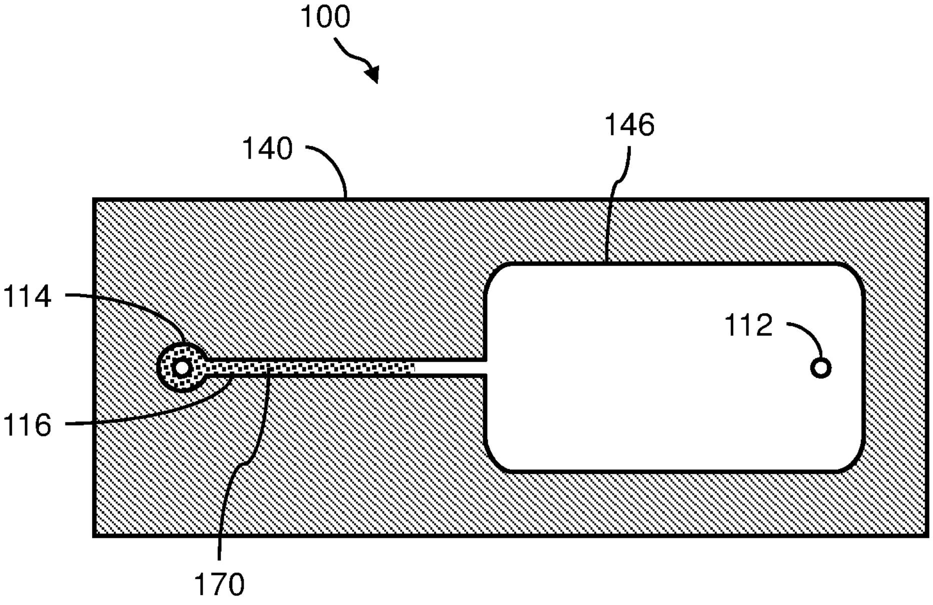
FIG. 22A and FIG. 22B illustrate plan views showing examples of other features that can be integrated into the presently disclosed modular active surface device.
Figure 22B:
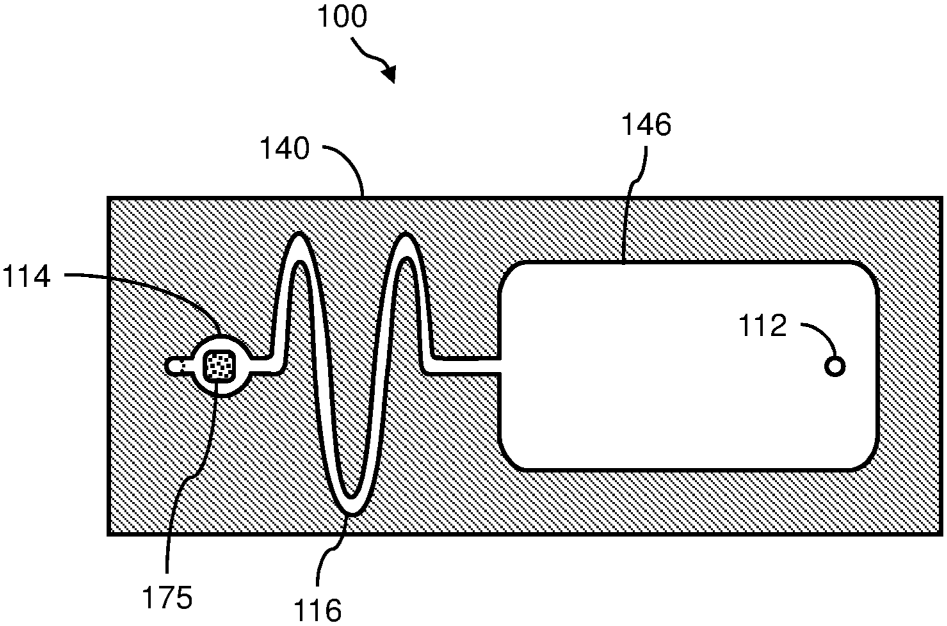

Any features can be integrated into the presently disclosed modular active surface devices 100. For example, FIG. 22A and FIG. 22B illustrate plan views showing examples of other features that can be integrated into the presently disclosed modular active surface devices 100. Referring now to FIG. 22A, mask layer 140 includes opening 146 (for forming reaction chamber 105); an antechamber 114 for receiving, for example, sample fluid; and a fluid path 116 between antechamber 114 and opening 146. Further, a quantity of dried reagent 170 is provided within antechamber 114, or along fluid path 116, or both. In operation, antechamber 114 can be flooded with, for example, sample fluid. Then, as the sample fluid flows along fluid path 116 toward reaction chamber 105, the dried reagent 170 dissolves (i.e., rehydrates or reconstitutes) and the mixture of sample fluid and reagent flows into reaction chamber 105. In other embodiments, the modular active surface devices 100 comprise reaction chambers 105 that include multiple antechambers 114. In some embodiments, there are separate fluid paths 116 between each of the multiple antechambers 114 and opening 146. In other embodiments, multiple antechambers 114 connect to a single fluid path 116 between the multiple antechambers 114 and opening 146. The flow of fluids from multiple antechambers 114 into the single fluid path 116 may be controlled by the opening and closing of valves between the multiple antechambers 114 and the single fluid path 116, wherein the opening and closing of the valves are controlled by a control instrument. Valving may be implemented in a variety of ways, such as a freeze-thaw valve using a thermoelectric chip, or configuring elastomeric material such as flaps of elastomeric material configured to reduce or eliminate fluid flow in response to positive pressure or a linear actuator. Alternatively, an elastomeric film could be utilized, wherein the elastomeric film is configured to reduce or eliminate fluid flow in response to pneumatic or mechanical deflection of the film. In some embodiments, substrate 150 comprises an elastomeric film configured to reduce or eliminate fluid flow in response to pneumatic or mechanical deflection of the film.

Referring now to FIG. 22B, a dried reagent pellet 175 can be provided in antechamber 114, which can be dissolved (i.e., rehydrated or reconstituted) when sample fluid is added to antechamber 114. In this example, fluid path 116 has a serpentine path. The purpose of the extended length of the serpentine fluid path 116 is to ensure that there is adequate time for dried reagent pellet 175 to dissolve completely before reaching reaction chamber 105.

In the examples shown in FIG. 22A and FIG. 22B, dried reagent 170 and/or dried reagent pellet 175 can be provided in the modular active surface devices 100 at time of manufacture. The dried reagent 170 and/or dried reagent pellet 175 are sealed within and stored with modular active surface devices 100 awaiting shipment and use. In another example, using a freeze drying (lyophilization) process, dried reagents and be provided on the microposts 122 themselves. In other embodiments, one or more of the modular active surface devices 100 comprise reaction chambers 105 that include multiple antechambers 114. In some embodiments, there are separate fluid paths 116 between each of the multiple antechambers 114 and opening 146. In other embodiments, multiple antechambers 114 connect to a single fluid path 116 between the multiple antechambers 114 and opening 146. The flow of fluids from multiple antechambers 114 into the single fluid path 116 may be controlled by the opening and closing of valves between the multiple antechambers 114 and the single fluid path 116, wherein the opening and closing of the valves are controlled by a control instrument. As described above, valving may be implemented in a variety of ways, such as a freeze-thaw valve using a thermoelectric chip, or configuring elastomeric material such as flaps of elastomeric material configured to reduce or eliminate fluid flow in response to positive pressure or a linear actuator. Alternatively, an elastomeric film could be utilized, wherein the elastomeric film is configured to reduce or eliminate fluid flow in response to pneumatic or mechanical deflection of the film. In some embodiments, substrate 150 comprises an elastomeric film configured to reduce or eliminate fluid flow in response to pneumatic or mechanical deflection of the film.

Figure 23A:
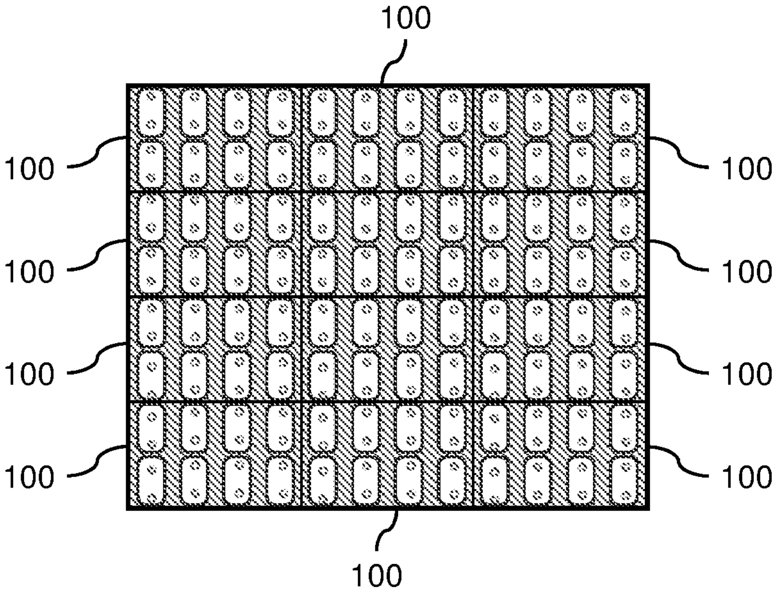
FIG. 23A and FIG. 23B illustrate an example of the presently disclosed modular active surface devices that has multiple reaction chambers.
Figure 23B:
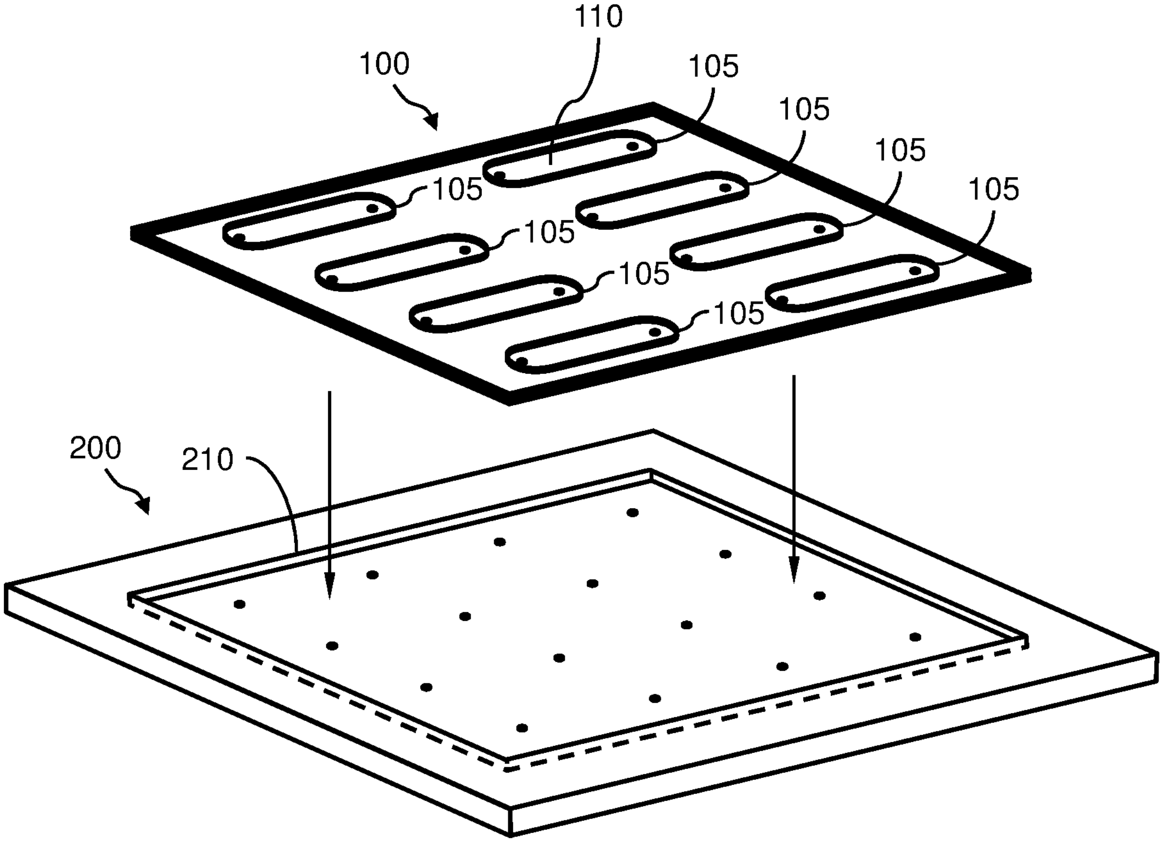

FIG. 23A and FIG. 23B illustrate an example of the presently disclosed modular active surface devices 100 that have multiple reaction chambers. In this example, modular active surface device 100 has eight reaction chambers 105, arranged in a 2×4 array. Namely, FIG. 23A shows a plan view of the wafer structure diced into multiple individual modular active surface devices 100, where each of the modular active surface devices 100 includes eight reaction chambers 105. FIG. 23B shows an example of one 8-chamber modular active surface device 100 in relation to a corresponding fluidics cartridge 200.

Other variations and features of the presently disclosed modular active surface devices 100 may include, but are not limited to, the following. Any surface in reaction chamber 105, including the microposts 122 themselves, can be modified, for example, to promote binding of a target analyte, to promote binding of something to select out for purifying the sample, modified like a microarray, and so on. There can be homogeneous modification or local modification (e.g., dots).

In another example, a completed modular active surface device 100 can be delivered to the user and then surface modifications can be performed in the field. For example, modular active surface device 100 can be delivered with blister packs. Then, the blister packs are used to release a surface modification chemical and rinsed when surface modification is complete.

Modular active surface devices 100 can support certain storage requirements. For example, modular active surface devices 100 (or at least the reaction chamber 105-portion) can be held under vacuum or in nitrogen (N2).

Liquid reagents can be provided in modular active surface devices 100 by, for example, flooding reaction chamber 105 after sealing and then, delivered to end user in this state. In another example, prior to sealing mask layer 140 (see FIG. 15), the openings 146 or reaction chambers 105 can be filled with liquid across the wafer, then the wafer is sealed, then diced, then devices shipped.

Pellet reagents can be used in modular active surface devices 100, as shown, for example, in FIG. 22B. In one example, the end user drops the pellet into the device at time of use. In another example, prior to sealing mask layer 140 (see FIG. 15), pellets can be dropped into each device across the wafer, then the wafer is sealed, then diced, then devices shipped. An antechamber, such as antechamber 114 shown in FIG. 22B, allows a lyophilized pellet to be stored in the module without risking physical damage to the active surface.

Further, the quality and relative bond strengths of adhesives used in modular active surface devices 100 can be varied. For example, want to be able to peel off protective layers 152 without delaminating other layers of the modular active surface devices 100. In this example, the bond strength of protective layers 152 is weaker than that of adhesives/bonds at other layers. The types of adhesives chosen may be based on materials, chemical, and/or specimen compatibility. Further, certain adhesive layers may undergo degasification.

Further, in some embodiments, modular active surface devices 100 can be provided to the end users absent, for example, the Melinex® active surface substrate 130. Namely, micropost active surface layer 110 absent the Melinex® active surface substrate 130. Then, the end user performs method 700 to bond micropost active surface layer 110 to their own plastic active surface substrate 130.

Concluding Remarks

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

Although the foregoing subject matter has been described in some detail by way of illustration and example for purposes of clarity of understanding, it will be understood by those skilled in the art that certain changes and modifications can be practiced within the scope of the appended claims.

What is claimed is:

1. A modular active surface device for processing biological materials comprising:

a first active surface atop a first active surface substrate;

at least one reaction chamber comprising fluid ports, wherein the fluid ports comprise one or more input ports and one or more output ports; and one or more additional layers selected from the group consisting of one or more adhesive layers, one or more stiffening layers for facilitating handling, and one or more peel-off sealing layers;

wherein the first active surface atop the first active surface substrate (i) forms at least one surface of the at least one reaction chamber and (ii) comprises a micropost active surface layer comprising surface-attached microposts;

a mask layer comprising an opening forming the at least one reaction chamber, an antechamber, and a fluid path between the antechamber and the opening; and further wherein the modular active surface device is configured to integrate into a microfluidics cartridge.

2. The modular active surface device of claim 1, further comprising:

a second active surface substrate mounted atop the mask layer, wherein a surface of the second active surface substrate faces the first active surface.

3. The modular active surface device of claim 2, wherein the surface of the second active surface substrate that faces the first active surface comprises a second active surface, and further wherein the first active surface and the second active surface are separated by a space.

4. The modular active surface device of claim 3, wherein the active surfaces are configured to manipulate a fluid inside the reaction chamber.

5. The modular active surface device of claim 4, wherein the active surfaces comprise one or more elements selected from the group consisting of static surface-attached microposts, actuated surface-attached microposts, a microscale texture, a microscale topography, a system for physical perturbation of the first active surface, an electrical, electronic, and/or electromagnetic system, and an optically active surface.

6. The modular active surface device of claim 5, wherein the system for physical perturbation of the first active surface is configured to perturb the first active surface by vibration or deformation.

7. The modular active surface device of claim 5, wherein the optically active surface comprises elements selected from the group consisting of lenses, LEDs, and one or more materials that interact with external light sources.

8. The modular active surface device of claim 4, wherein manipulation of the fluid inside the reaction chamber is selected from the group consisting of generating fluid flow, altering the flow profile of an externally driven fluid, fractionating a sample into constituent parts, establishing one or more concentration gradients, and eliminating one or more concentration gradients.

9. The modular active surface device of any one of claims 2 to 8, wherein the active surface substrates are rigid or semi-rigid plastic substrates.

10. The modular active surface device of any one of claims 3 to 9, wherein the second active surface comprises a second micropost active surface layer comprising surface-attached microposts.

11. The modular active surface device of claim 1, wherein the surface-attached microposts are arranged in arrays.

12. The modular active surface device of claim 11, wherein the surface-attached microposts are configured for actuation in the presence of an actuation force.

13. The modular active surface device of claim 12, wherein the actuation force is selected from the group consisting of a magnetic field, a thermal field, a sonic field, an optical field, an electrical field, and a vibrational field.

14. The modular active surface device of any one of claims 1 to 13, wherein the micropost active surface layer in the reaction chamber is configured for mixing operations, binding operations, and cell processing operations.

15. The modular active surface device of claim 14, wherein the cell processing operations are selected from the group consisting of: cell concentration, cell collection, cell filtration, cell washing, cell counting, cell recovery, cell lysis, and cell de-clumping.

16. The modular active surface device of any one of claims 1 to 15, wherein the microfluidics cartridge comprises a recessed region configured to receive the modular active surface device.

17. The modular active surface device of claim 16, wherein the microfluidics cartridge further comprises fluid lines set to correspond to the fluid port, wherein when the microfluidics cartridge receives the modular active surface device, the microfluidics cartridge and the modular active surface device are fluidly coupled.

18. The modular active surface device of any one of claims 1 to 17, further comprising an adhesive layer for bonding to the microfluidics cartidge cartridge.

19. The modular active surface device of any one of claims 1 to 18, wherein the microposts are formed of an active surface material.

20. The modular active surface device of claim 19, wherein the active surface material is polydimethylsiloxane (PDMS).

21. The modular active surface device of any one of claims 1 to 20, wherein the surface-attached microposts range in length from about 1 μm to about 100 μm.

22. The modular active surface device of any one of claims 1 to 21, wherein the surface-attached microposts range in diameter from about 0.1 μm to about 10 μm.

23. The modular active surface device of any one of claims 1 to 22, wherein the surface-attached microposts have a cross-sectional shape selected from the group consisting of circular, ovular, square, rectangular, and triangular.

24. The modular active surface device of any one of claims 1 to 23, wherein the surface-attached microposts are oriented substantially normal to the plane of the first active surface substrate.

25. The modular active surface device of any one of claims 1 to 23, wherein the surface-attached microposts are oriented at an angle a with respect to normal of the plane of the first active surface substrate.

26. The modular active surface device of any one of claims 1 to 25, wherein the microposts are oriented at a pitch of from about 0 μm to about 50 μm.

27. The modular active surface device of claim 25, wherein the angle $\alpha$ is about 0 degrees to about 45 degrees with respect to normal of the plane of the first active surface substrate.

28. The modular active surface device of claim 1, wherein the antechamber comprises dried reagent and/or a dried reagent pellet configured to dissolve when a sample fluid is added to the antechamber, thereby enabling a mixture of sample fluid and reagent to flow into the at least one reaction chamber.

29. The modular active surface device of claim 28, wherein the fluid path has a serpentine path configured to provide adequate time for the dried reagent and/or dried reagent pellet to dissolve completely before reaching the at least one reaction chamber.

30. The modular active surface device of any one of claim 1 or 28 to 29, comprising multiple antechambers and separate fluid paths between each antechamber and the opening.

31. The modular active surface device of any one of claim 1 or 28 to 29, comprising multiple antechambers and a single fluid path between the multiple antechambers and the opening.

32. The modular active surface device of claim 31, wherein the flow of fluids from the multiple antechambers into the single fluid path is controlled by the opening and closing of valves between the multiple antechambers and the single fluid path, and wherein the opening and closing of the valves are controlled by a control instrument.

33. The modular active surface device of any one of claims 1 to 32, comprising a plurality of reaction chambers arranged in an array.

34. The modular active surface device of claim 33, wherein the plurality of reaction chambers comprises eight reaction chambers arranged in a 2×4 array.

35. A wafer-scale manufacturing process for producing the modular active surface device of any one of claims 1 to 34, comprising the steps of:

(a) providing an active surface material-filled polycarbonate (PC) substrate comprising active surface material microposts of the micropost active surface layer embedded in the substrate;

(b) forming an active surface wafer by bonding the active surface material-side of the active surface material-filled PC substrate to a second substrate using a plasma bonding process;

(c) forming a plurality of through-holes in the active surface wafer to form a cut active surface wafer;

(d) releasing the microposts of the cut active surface wafer to form a released active surface wafer;

(e) providing a mask layer and installing the mask layer atop the released active surface wafer to form a masked active surface wafer;

(f) sealing both sides of the masked active surface wafer to produce a masked and sealed active surface wafer; and (g) dicing the masked and sealed active surface wafer into multiple individual modular active surface devices.

36. A wafer-scale manufacturing process for producing the modular active surface device of any one of claims 1 to 34, comprising the steps of:

(a) providing an active surface material-filled substrate comprising an active surface material micropost array of the micropost active surface layer embedded in the substrate;

(b) providing a second substrate to which the active surface material micropost array can be bonded;

(c) depositing a silicon oxide layer on one surface of the second substrate;

(d) plasma treating the silicon oxide layer;

(e) placing the active surface material micropost array into contact with the silicon oxide layer of the second substrate; and (f) performing a plasma activation process to bond the active surface material micropost array to the silicon oxide later of the substrate.

37. The wafer-scale manufacturing process of any one of claims 35 to 36, wherein the active surface material is polydimethylsiloxane (PDMS).

* * * * *